(12) United States Patent
Chang et al.

(10) Patent No.: US 11,815,666 B2
(45) Date of Patent: Nov. 14, 2023

(54) WIDE-ANGLE LENS ASSEMBLY INCLUDING NINE LENSES OF --+++-++- OR --+++-+-+, OR TEN LENSES OF --+++--+++ OR ---+++-+-+ REFRACTIVE POWERS

(71) Applicants: Sintai Optical (Shenzhen) Co., Ltd., ShenZhen (CN); Asia Optical Co., Inc., Taichung (TW)

(72) Inventors: An-Kai Chang, Taichung (TW); Po-Yuan Shih, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 379 days.

(21) Appl. No.: 17/000,470

(22) Filed: Aug. 24, 2020

(65) Prior Publication Data

US 2021/0072517 A1    Mar. 11, 2021

(30) Foreign Application Priority Data

Sep. 6, 2019   (CN) .......................... 201910842019.3
Dec. 17, 2019   (CN) .......................... 201911300412.6

(51) Int. Cl.
  *G02B 13/04*   (2006.01)
  *G02B 9/64*   (2006.01)

(52) U.S. Cl.
  CPC ............... *G02B 13/04* (2013.01); *G02B 9/64* (2013.01)

(58) Field of Classification Search
  CPC .................................. G02B 13/04; G02B 9/64
  See application file for complete search history.

(56) References Cited

U.S. PATENT DOCUMENTS 8,908,292 B2   12/2014   Chou et al.
9,235,036 B2   1/2016   Kato et al.
(Continued)

FOREIGN PATENT DOCUMENTS

CN   205562935 U   9/2016
CN   106019532 A   10/2016
(Continued)

OTHER PUBLICATIONS

CN 207164349, translation (Year: 2018).*

*Primary Examiner* — Wen Huang
(74) *Attorney, Agent, or Firm* — McClure, Qualey & Rodack, LLP

(57) ABSTRACT

A wide-angle lens assembly includes a first lens including negative refractive power and a concave surface, a second lens including a meniscus lens with negative refractive power, a third lens, a fourth lens including positive refractive power and a convex surface, a fifth lens including a biconvex lens, a sixth lens including a biconvex lens, a seventh lens including positive refractive power and a convex surface, an eighth lens including a biconcave lens, a ninth lens including negative refractive power, and a stop disposed between the fourth lens and the sixth lens. The eighth lens is disposed between the fifth and seventh lenses and is cemented with at least one lens. The ninth lens is disposed between the fifth lens and an image side. The wide-angle lens assembly satisfies $1.3<A/IH<2.1$ where A is a diameter of the stop and 1H is a maximum image height of the wide-angle lens assembly.

20 Claims, 24 Drawing Sheets

(56) References Cited

U.S. PATENT DOCUMENTS

2012/0262803 A1    10/2012  Matsuo
2017/0227746 A1*   8/2017   Noda ....................... G02B 9/64

FOREIGN PATENT DOCUMENTS

| | | |
|---|---|---|
| CN | 107045185 A | 8/2017 |
| CN | 107167903 A | 9/2017 |
| CN | 107632369 A | 1/2018 |
| CN | 107632379 A | 1/2018 |
| CN | 207164349 U | 3/2018 |
| CN | 108227155 A | 6/2018 |
| CN | 108519660 A | 9/2018 |
| CN | 108563000 A | 9/2018 |
| CN | 109814236 A | 5/2019 |
| CN | 208953767 U | 6/2019 |
| JP | 201940121 A | 5/2019 |
| JP | 2019090949 A | 6/2019 |
| TW | 201007206 A | 2/2010 |
| TW | I671566 A | 3/2020 |

\* cited by examiner

WIDE-ANGLE LENS ASSEMBLY INCLUDING NINE LENSES OF --+++-++- OR --+++-+-+, OR TEN LENSES OF --+++--+++ OR ---+++-+-+ REFRACTIVE POWERS

BACKGROUND OF THE INVENTION

Field of the Invention

The invention relates to a wide-angle lens assembly.

Description of the Related Art

The current development trend of a wide-angle lens assembly is toward large field of view and high resolution. Additionally, the wide-angle lens assembly is developed to have resisted environmental temperature change in accordance with different application requirements. However, the known wide-angle lens assembly can't satisfy such requirements. Therefore, the wide-angle lens assembly needs a new structure in order to meet the requirements of small F-number, high resolution, and resisted environmental temperature change at the same time.

BRIEF SUMMARY OF THE INVENTION

The invention provides a wide-angle lens assembly to solve the above problems. The wide-angle lens assembly of the invention is provided with characteristics of a decreased F-number, an increased resolution, a resisted environmental temperature change, and still has a good optical performance.

The wide-angle lens assembly in accordance with an exemplary embodiment of the invention includes a first lens, a second lens, a third lens, a fourth lens, a fifth lens, a sixth lens, a seventh lens, an eighth lens, a ninth lens, and a stop. The first lens is with negative refractive power and includes a concave surface facing an image side. The second lens is a meniscus lens with negative refractive power. The third lens is with refractive power. The fourth lens is with positive refractive power and includes a convex surface facing an object side. The fifth lens is a biconvex lens with positive refractive power and includes a convex surface facing the object side and another convex surface facing the image side. The sixth lens is a biconvex lens with positive refractive power and includes a convex surface facing the object side and another convex surface facing the image side. The seventh lens is with positive refractive power and includes a convex surface facing the object side. The eighth lens is a biconcave lens with negative refractive power and includes a concave surface facing the object side and another concave surface facing the image side. The ninth lens is with negative refractive power. The first lens, the second lens, the third lens, the fourth lens, the fifth lens, the sixth lens, and the seventh lens are arranged in order from the object side to the image side along an optical axis. The eighth lens is disposed between the fifth lens and the seventh lens and is cemented with at least one lens. The ninth lens is disposed between the fifth lens and the image side. The stop is disposed between the fourth lens and the sixth lens. The wide-angle lens assembly satisfies the following condition: $1.3 < A/IH < 2.1$; wherein A is a diameter of the stop and IH is a maximum image height of the wide-angle lens assembly.

In another exemplary embodiment, the ninth lens is a meniscus lens.

In yet another exemplary embodiment, the wide-angle lens assembly further includes a tenth lens disposed between the fifth lens and the image side, wherein the tenth lens is with positive refractive power and includes a convex surface facing the object side.

In another exemplary embodiment, the tenth lens further includes a convex surface facing the image side.

In yet another exemplary embodiment, the tenth lens further includes a concave surface facing the image side.

In another exemplary embodiment, the wide-angle lens assembly satisfies at least one of the following conditions: $0.2 < f/TTL < 0.35$; $7.5 < T_{RL1}/T_1 < 14$; $1 < f_{1234}/f < 2.1$; $0 < f/IH < 1$; $10 < Vd_5/Nd_5 < 58$; $0.5 < (f_3 + f_{RL1})/f < 3$; $7.2 < f_1/fl < 11$; $4.5 \text{ mm} < R_{21} - R_{22} < 13.5 \text{ mm}$; $-10 < R_{31}/R_{32} < 0$; $-15 \text{ mm} < R_{RL21} + R_{RL22} < -5 \text{ mm}$; wherein f is an effective focal length of the wide-angle lens assembly, $f_1$ is an effective focal length of the first lens, $f_3$ is an effective focal length of the third lens, $f_{RL1}$ is an effective focal length of a lens closest to the image side, $f_{1234}$ is an effective focal length of a combination of the first lens, the second lens, the third lens, and the fourth lens, TTL is an interval from an object side surface of the first lens to an image plane along the optical axis, $T_1$ is a thickness along the optical axis of the first lens, $T_{RL1}$ is a thickness along the optical axis of a lens closest to the image side, IH is a maximum image height of the wide-angle lens assembly, $Vd_5$ is an Abbe number of the fifth lens, $Nd_5$ is an index of refraction of the fifth lens, $R_{21}$ is a radius of curvature of an object side surface of the second lens, $R_{22}$ is a radius of curvature of an image side surface of the second lens, $R_{31}$ is a radius of curvature of an object side surface of the third lens, $R_{32}$ is a radius of curvature of an image side surface of the third lens, $R_{RL21}$ is a radius of curvature of an object side surface of a lens second close to the image side, and $R_{RL22}$ is a radius of curvature of an image side surface of a lens second close to the image side.

In yet another exemplary embodiment, the third lens is a biconvex lens with positive refractive power and includes a convex surface facing the object side and another convex surface facing the image side.

In another exemplary embodiment, the first lens further includes a concave surface facing the object side and the second lens includes a concave surface facing the object side and a convex surface facing the image side.

In yet another exemplary embodiment, the fourth lens further includes another convex surface facing the image side, the seventh lens further includes a concave surface facing the image side, the ninth lens is a meniscus lens and includes a concave surface facing the object side and a convex surface facing the image side, and the ninth lens is cemented with at least one lens.

In another exemplary embodiment, the fourth lens further includes a concave surface facing the image side and the ninth lens is a meniscus lens and includes a convex surface facing the object side and a concave surface facing the image side.

In yet another exemplary embodiment, the third lens is a biconcave lens with negative refractive power and includes a concave surface facing the object side and another concave surface facing the image side.

In another exemplary embodiment, the first lens further includes a convex surface facing the object side and the second lens includes a convex surface facing the object side and a concave surface facing the image side.

In yet another exemplary embodiment, the fourth lens further includes another convex surface facing the image side and the ninth lens is a meniscus lens and includes a concave surface facing the object side and a convex surface facing the image side.

In another exemplary embodiment, the seventh lens further includes a concave surface facing the image side.

In yet another exemplary embodiment, the seventh lens further includes a convex surface facing the image side.

In another exemplary embodiment, the ninth lens is cemented with at least one lens.

In yet another exemplary embodiment, the wide-angle lens assembly satisfies at least one of the following conditions: $0.2<f/TTL<0.35$; $7.5<T_{RL1}/T_1<14$; $1<f_{1234}/f<2.1$; wherein f is an effective focal length of the wide-angle lens assembly, TTL is an interval from an object side surface of the first lens to an image plane along the optical axis, $T_{RL1}$ is a thickness along the optical axis of a lens closest to the image side, $T_1$ is a thickness along the optical axis of the first lens, and $f_{1234}$ is an effective focal length of a combination of the first lens, the second lens, the third lens, and the fourth lens.

In another exemplary embodiment, the wide-angle lens assembly satisfies at least one of the following conditions: $0<f/IH<1$; $10<Vd_5/Nd_5<58$; wherein f is an effective focal length of the wide-angle lens assembly, IH is a maximum image height of the wide-angle lens assembly, $Vd_5$ is an Abbe number of the fifth lens, and $Nd_5$ is an index of refraction of the fifth lens.

In yet another exemplary embodiment, the wide-angle lens assembly satisfies at least one of the following conditions: $0.5<(f_3+f_{RL1})/f<3$; $7.2<f_1/f|<11$; wherein $f_1$ is an effective focal length of the first lens, $f_3$ is an effective focal length of the third lens, $f_{RL1}$ is an effective focal length of a lens closest to the image side, and f is an effective focal length of the wide-angle lens assembly.

In another exemplary embodiment, the wide-angle lens assembly satisfies at least one of the following conditions: 4.5 mm$<R_{21}-R_{22}<13.5$ mm; $-10<R_{31}/R_{32}<0$; $-15$ mm$<R_{RL21}+R_{RL22}<-5$ mm; wherein $R_{21}$ is a radius of curvature of an object side surface of the second lens, $R_{22}$ is a radius of curvature of an image side surface of the second lens, $R_{31}$ is a radius of curvature of an object side surface of the third lens, $R_{32}$ is a radius of curvature of an image side surface of the third lens, $R_{RL21}$ is a radius of curvature of an object side surface of a lens second close to the image side, and $R_{RL22}$ is a radius of curvature of an image side surface of a lens second close to the image side.

The condition: $0.2<f/TTL<0.35$ can help the wide-angle lens assembly to achieve miniaturization. The condition: $1<f_{1234}/f<2.1$ can balance the refractive power distribution of the front part lens so as to effectively control the field of view and significantly improve the resolution for the wide-angle lens assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
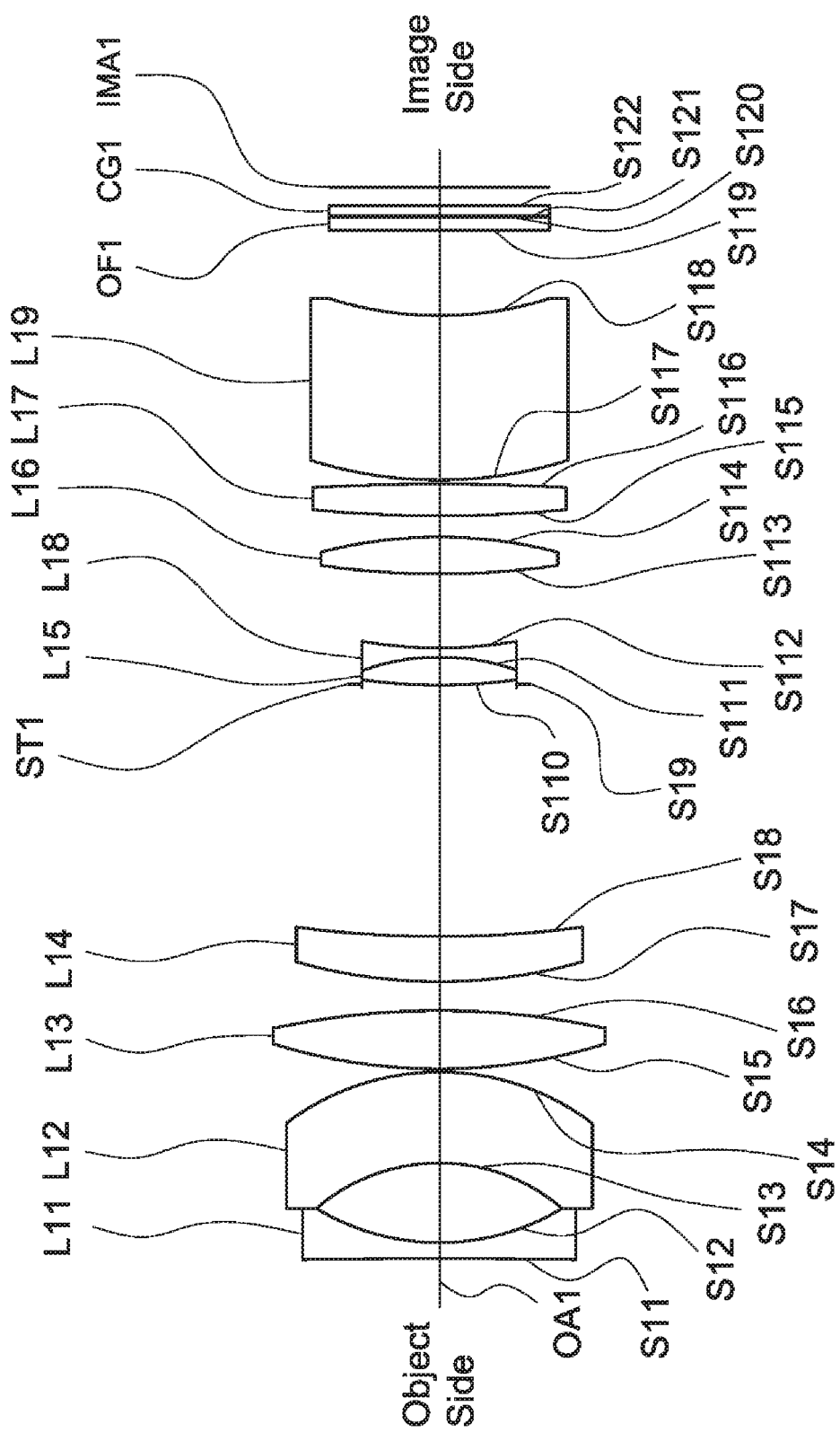
FIG. 1 is a lens layout diagram of a wide-angle lens assembly in accordance with a first embodiment of the invention.

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a stop, a fifth lens, a sixth lens, a seventh lens, an eighth lens, and a ninth lens. The first lens which is with negative refractive power and includes a concave surface facing an image side. The second lens is a meniscus lens with negative refractive power. The third lens is with refractive power. The fourth lens is with positive refractive power and includes a convex surface facing an object side. The fifth lens is a biconvex lens with positive refractive power and includes a convex surface facing the object side and another convex surface facing the image side. The sixth lens is a biconvex lens with positive refractive power and includes a convex surface facing the object side and another convex surface facing the image side. The seventh lens is with positive refractive power and includes a convex surface facing the object side. The eighth lens is a biconcave lens with negative refractive power and includes a concave surface facing the object side and another concave surface facing the image side. The ninth lens is with refractive power. The first lens, the second lens, the third lens, the fourth lens, the fifth lens, the sixth lens, and the seventh lens are arranged in order from the object side to the image side along an optical axis. The eighth lens is disposed between the fifth lens and the seventh lens and is cemented with at least one lens. The ninth lens is disposed between the fifth lens and an image plane. The stop is disposed between the fourth lens and the sixth lens. The wide-angle lens assembly satisfies the following conditions: 1.3<A/IH<2.1, wherein A is a diameter of the stop and IH is a maximum image height of the wide-angle lens assembly Referring to Table 1, Table 3, Table 4, Table 6, Table 7, Table 9, Table 11, and Table 13, wherein Table 1, Table 3, Table 6, Table 9, Table 11, and Table 13 show optical specification in accordance with a first, second, third, fourth, fifth, and sixth embodiments of the invention respectively and Table 4 and Table 7 show aspheric coefficient of each aspheric lens in Table 3 and Table 6 respectively.

FIG. 1, FIG. 3, FIG. 5, FIG. 7, FIG. 9, and FIG. 11 are lens layout diagrams of the wide-angle lens assembly in accordance with the first, second, third, fourth, fifth, and sixth embodiments of the invention respectively.

The first lens L11, L21, L31, L41, L51, L61 are with negative refractive power and made of glass material, wherein the image side surfaces S12, S22, S32, S42, S52, S62 are concave surfaces, and the object side surfaces S11, S21, S31, S41, S51, S61 and the image side surfaces S12, S22, S32, S42, S52, S62 are spherical surfaces.

The second lens L12, L22, L32, L42, L52, L62 are meniscus lenses with negative refractive power and made of glass material, wherein the object side surfaces S13, S23, S33, S43, S53, S63 and the image side surfaces S14, S24, S34, S44, S54, S64 are spherical surfaces.

The third lens L13, L23, L33, L43, L53, L63 are with refractive power and made of glass material, wherein the object side surfaces S15, S25, S35, S45, S55, S65 and the image side surfaces S16, S26, S36, S46, S56, S66 are spherical surfaces.

The fourth lens L14, L24, L34, L44, L54, L64 are with positive refractive power and made of glass material, wherein the object side surfaces S17, S27, S37, S47, S57, S67 are concave surfaces and the object side surfaces S17, S27, S37, S47, S57, S67 and the image side surfaces S18, S28, S38, S48, S58, S68 are spherical surfaces.

The fifth lens L15, L25, L35, L45, L55, L65 are biconvex lenses with positive refractive power and made of glass material, wherein the object side surfaces S110, S210, S310, S49, S59, S69 are convex surfaces, the image side surfaces S111, S211, S311, S410, S510, S610 are convex surfaces, and the object side surfaces S110, S210, S310, S49, S59, S69 and the image side surfaces S11, S211, S311, S410, S510, S610 are spherical surfaces.

The sixth lens L16, L26, L36, S46, S56, S66 are biconvex lenses with positive refractive power and made of glass material, wherein the object side surfaces S113, S213, S316, S415, S512, S615 are convex surfaces, the image side surfaces S114, S214, S317, S416, S513, S616 are convex surfaces, and the object side surfaces S113, S213, S316, S415, S512, S615 and the image side surfaces S114, S214, S317, S416, S513, S616 are spherical surfaces.

The seventh lens L17, L27, L37, L47, L57, L67 are with positive refractive power and made of glass material, wherein the object side surfaces S115, S217, S318, S418, S515, S618 are convex surfaces.

The eighth lens L18, L28, L38, S48, S58, S68 are biconcave lenses with negative refractive power and made of glass material, wherein the object side surfaces S111, S211, S311, S413, S513, S613 are concave surfaces, the image side surfaces S112, S212, S312, S414, S514, S614 are concave surfaces, and the object side surfaces S111, S211, S311, S413, S513, S613 and the image side surfaces S112, S212, S312, S414, S514, S614 are spherical surfaces.

The ninth lens L19, L29, L39, 149, L59, L69 are meniscus lenses with negative refractive power and made of glass material.

The eighth lenses L18, L28, L38, L48, L58, L68 and the fifth lenses L15, L25, L35, the tenth lens L410, the sixth lens L56, the tenth lens L610 are cemented respectively.

In addition, the wide-angle lens assembly 1, 2, 3 satisfy at least one of the following conditions:

$$0.2 < f/TTL < 0.35; \quad (1)$$

$$7.5 < T_{RL1}/T_1 < 14; \quad (2)$$

$$1 < f_{1234}/f < 2.1; \quad (3)$$

$$1.3 < A/IH < 2.1; \quad (4)$$

wherein f is an effective focal length of the wide-angle lens assemblies 1, 2, 3 for the first to third embodiments, $f_{1234}$ is an effective focal length of a combination of the first lenses L11, L21, L31, the second lenses L12, L22, L32, the third lenses L13, L23, L33, and the fourth lenses L14, L24, L34 respectively for the first to third embodiments, TTL is an interval from an object side surfaces S11, S21, S31 of the first lenses L11, L21, L31 to image planes IMA1, IMA2, IMA3 along the optical axes OA1, OA2, OA3 respectively for the first to third embodiments, $T_1$ is a thickness along the optical axes OA1, OA2, OA3 of the first lenses L11, L21, L31 respectively for the first to third embodiments, $T_{RL1}$ is a thickness along the optical axes OA1, OA2, OA3 of the lens L19, L27, L37 (closest to the image side) respectively for the first to third embodiments, A is a diameter of the stops ST1, ST2, ST3 respectively for the first to third embodiments, and IH is a maximum image height of the wide-angle lens assembly 1, 2, 3 respectively for the first to third embodiments. With the lens assemblies 1, 2, 3 satisfying at least one of the above conditions (1)-(4), the F-number can be effectively decreased, the resolution can be effectively increased, and the environmental temperature change can be effectively resisted.

In addition, the wide-angle lens assembly 4, 5, 6 satisfy at least one of the following conditions:

$$0 < f/IH < 1; \quad (5)$$

$$4.5 \text{ mm} < R_{21} - R_{22} < 13.5 \text{ mm}; \quad (6)$$

$$-10 < R_{31}/R_{32} < 0; \quad (7)$$

$$0.5 < (f_3 + f_{RL1})/f < 3; \quad (8)$$

$$10 < Vd_5/Nd_5 < 58; \quad (9)$$

$$7.2 < |f_1/f| < 11; \quad (10)$$

$$-15 \text{ mm} < R_{RL21} + R_{RL22} < -5 \text{ mm}; \quad (11)$$

$$1.3 < A/IH < 2.1; \quad (12)$$

wherein f is an effective focal length of the wide-angle lens assemblies 4, 5, 6 respectively for the fourth to sixth embodiments, $f_1$ is an effective focal length of the first lenses L41, L51, L61 respectively for the fourth to sixth embodiments, $f_3$ is an effective focal length of the third lenses L43, L53, L63 respectively for the fourth to sixth embodiments, $f_{RL1}$ is an effective focal length of the lenses L47, L510, L67 (closest to the image side) respectively for the fourth to sixth embodiments, IH is a maximum image height of the wide-angle lens assemblies 4, 5, 6 respectively for the fourth to sixth embodiments, $Vd_5$ is an Abbe number of the fifth lenses L45, L55, L65 respectively for the fourth to sixth embodiments, $Nd_5$ is an index of refraction of the fifth lenses L45, L55, L65 respectively for the fourth to sixth embodiments, $R_{21}$ is a radius of curvature of the object side surfaces S43, S53, S63 of the second lenses L42, L52, L62 respectively for the fourth to sixth embodiments, $R_{22}$ is a radius of curvature of the image side surfaces S44, S54, S64 of the second lenses L42, L52, L62 respectively for the fourth to sixth embodiments, $R_{31}$ is a radius of curvature of the object side surfaces S45, S55, S65 of the third lenses L43, L53, L63 respectively for the fourth to sixth embodiments, $R_{32}$ is a radius of curvature of the image side surfaces S46, S56, S66 of the third lenses L43, L53, L63 respectively for the fourth to sixth embodiments. $R_{RL2}$ is a radius of curvature of the object side surfaces S416, S516, S616 of the ninth lenses L49, L59, L69 (second close to the image side) respectively for the fourth to sixth embodiments, and $R_{RL22}$ is a radius of curvature of the image side surfaces S417, S517, S617 of the ninth lenses L49, L59, L69 (second close to the image side) respectively for the fourth to sixth embodiments, A is a diameter of the stops ST1, ST2, ST3 respectively for the fourth to sixth embodiments, and IH is a maximum image height of the wide-angle lens assemblies 4, 5, 6 respectively for the fourth to sixth embodiments. With the lens assemblies 4, 5, 6 satisfying at least one of the above conditions (5)-(12), the total lens length can be effectively shortened, the field of view can be effectively increased, the brightness can be effectively increased, the resolution can be effectively increased, the environmental temperature change can be effectively resisted, the aberration can be effectively corrected, and the chromatic aberration can be effectively corrected.

A detailed description of a wide-angle lens assembly in accordance with a first embodiment of the invention is as follows. Referring to FIG. 1, the wide-angle lens assembly 1 includes a first lens L11, a second lens L12, a third lens L13, a fourth lens L14, a stop ST1, a fifth lens L15, an eighth lens L18, a sixth lens L16, a seventh lens L17, a ninth lens L19, an optical filter OF1, and a cover glass CG1, all of which are arranged in order from an object side to an image side along an optical axis OA1. In operation, an image of light rays from the object side is formed at an image plane IMA1.

According to the foregoing, wherein: the first lens L11 is a biconcave lens, wherein the object side surface S11 is a concave surface; the object side surface S13 of the second lens L12 is a concave surface and the image side surface S14 of the second lens L12 is a convex surface; the third lens L13 is a biconvex lens with positive refractive power and made of glass material, wherein the object side surface S15 is a convex surface and the image side surface S16 is a convex surface; the fourth lens L14 is a meniscus lens, wherein the image side surface S18 is a concave surface; the seventh lens L17 is a biconvex lens, wherein the image side surface S116 is a convex surface and the object side surface S115 and the image side surface S116 are spherical surfaces; the object side surface S17 of the ninth lens L19 is a convex surface and the image side surface S18 of the ninth lens L19 is a concave surface; both of the object side surface S119 and image side surface S120 of the optical filter OF1 are plane surfaces; and both of the object side surface S121 and image side surface S122 of the cover glass CG1 are plane surfaces.

With the above design of the lenses and stop ST1 and at least any one of the conditions (1)-(4) satisfied, the wide-angle lens assembly 1 can have an effective decreased F-number, an effective increased resolution, and an effective resisted environmental temperature change.

If the value f/TTL of condition (1) is less than 0.2, it is difficult to achieve the purpose of miniaturization. Therefore, the value of f/TTL must be at least greater than 0.2. An optimal range for f/TTL is between 0.2 and 0.35. The wide-angle lens assembly has the best condition of miniaturization when satisfies the condition (1): 0.2<f/TTL<0.35.

Table 1 shows the optical specification of the wide-angle lens assembly 1 in FIG. 1.

TABLE 1

Effective Focal Length = 11.46 mm F-number = 1.83
Total Lens Length = 50.441 mm Field of View = 52.77 degrees

| Surface Number | Radius of Curvature (mm) | Thickness (mm) | Nd | Vd | Effective Focal Length (mm) | Remark |
|---|---|---|---|---|---|---|
| S11 | −312.446 | 0.806 | 1.92 | 24 | −12.0725 | The First Lens L11 |
| S12 | 11.545 | 3.746 | | | | |
| S13 | −9.094 | 4.242 | 1.62 | 63.4 | −158.009 | The Second Lens L12 |
| S14 | −11.815 | 0.100 | | | | |
| S15 | 26.077 | 2.793 | 1.77 | 49.6 | 19.939 | The Third Lens L13 |
| S16 | −35.869 | 1.350 | | | | |
| S17 | 23.577 | 2.097 | 1.95 | 18 | 52.8144 | The Fourth Lens L14 |

TABLE 1-continued

Effective Focal Length = 11.46 mm F-number = 1.83
Total Lens Length = 50.441 mm Field of View = 52.77 degrees

| Surface Number | Radius of Curvature (mm) | Thickness (mm) | Nd | Vd | Effective Focal Length (mm) | Remark |
|---|---|---|---|---|---|---|
| S18 | 42.720 | 11.922 | | | | |
| S19 | ∞ | −0.081 | | | | Stop ST1 |
| S110 | 28.690 | 1.407 | 1.55 | 75.5 | 12.691 | The Fifth Lens L15 |
| S111 | −9.070 | 0.410 | 1.85 | 23.8 | −7.5215 | The Eighth Lens L18 |
| S112 | 21.812 | 3.486 | | | | |
| S113 | 40.917 | 1.684 | 1.73 | 54.7 | 19.8258 | The Sixth Lens L16 |
| S114 | −21.965 | 0.983 | | | | |
| S115 | 58.819 | 1.519 | 1.91 | 35.3 | 38.6457 | The Seventh Lens L17 |
| S116 | −86.562 | 0.135 | | | | |
| S117 | 19.623 | 7.783 | 1.59 | 68.6 | −3495.73 | The Ninth Lens L19 |
| S118 | 16.569 | 3.971 | | | | |
| S119 | ∞ | 0.550 | 1.52 | 64.2 | | Optical Filter OF1 |
| S120 | ∞ | 0.146 | | | | |
| S121 | ∞ | 0.500 | 1.52 | 64.2 | | Cover Glass CG1 |
| S122 | ∞ | 0.893 | | | | |

Table 2 shows the parameters and condition values for conditions (1)-(4) in accordance with the first embodiment of the invention. It can be seen from Table 2 that the wide-angle lens assembly 1 of the first embodiment satisfies the conditions (1)-(4).

TABLE 2

| A | 7.375 mm | IH | 5.175 mm | $f_{1234}$ | 21.7225 mm |
|---|---|---|---|---|---|
| f/TTL | 0.23 | $T_{RL1}/T_1$ | 9.66 | $f_{1234}/f$ | 1.90 |
| A/IH | 1.43 | | | | |

Figure 2A:
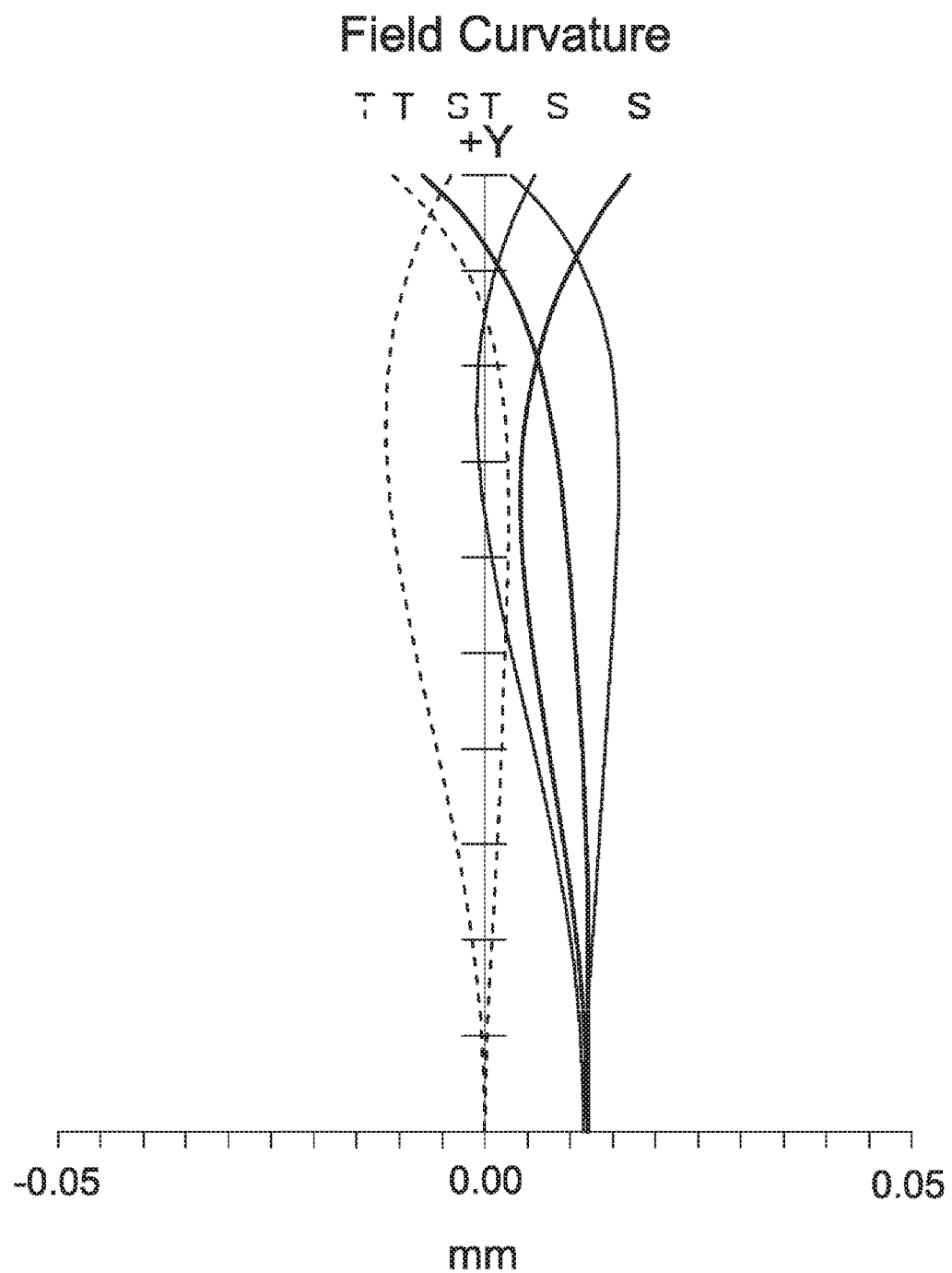
FIG. 2A depicts a field curvature diagram of the wide-angle lens assembly in accordance with the first embodiment of the invention.
Figure 2B:
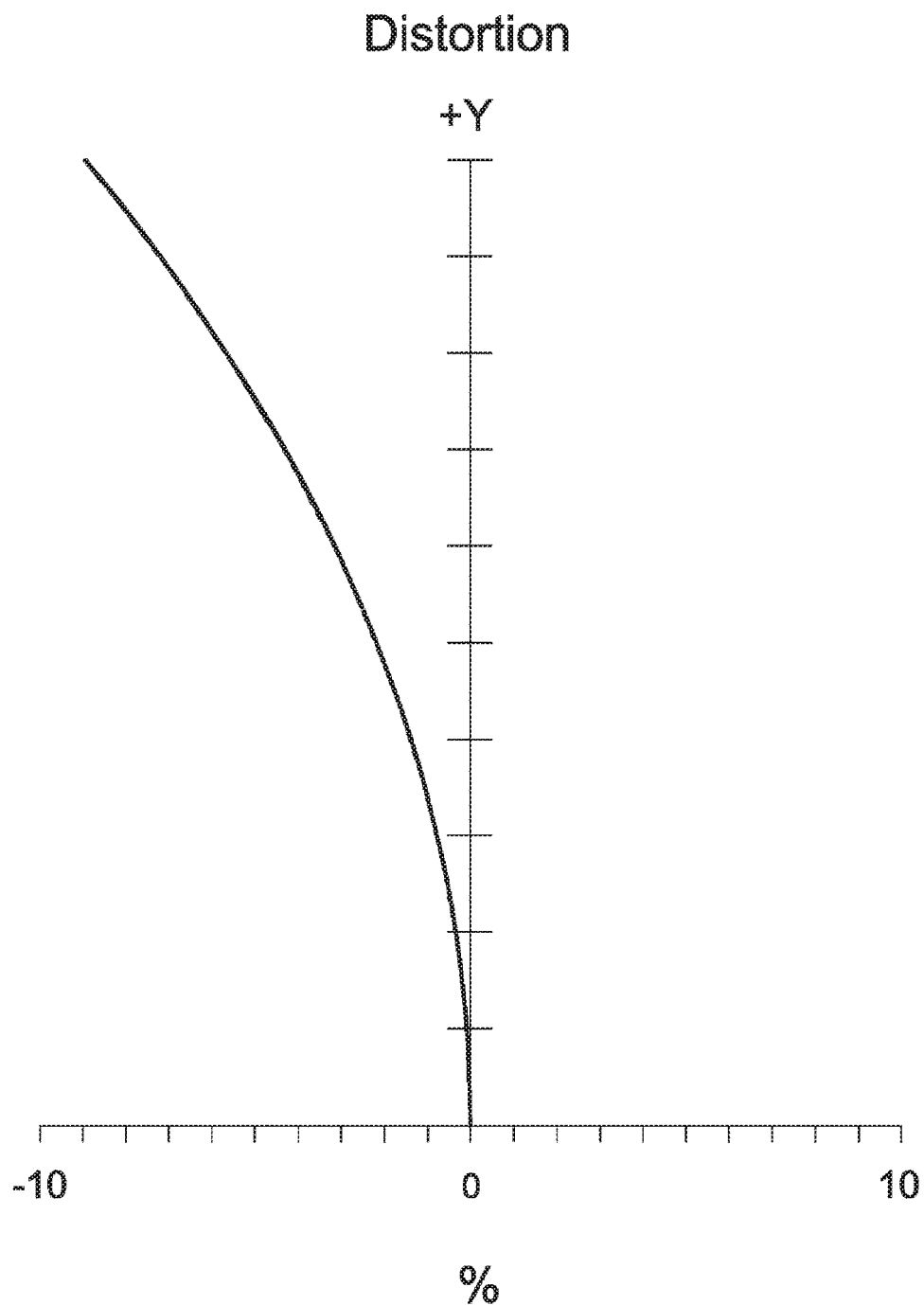
FIG. 2B is a distortion diagram of the wide-angle lens assembly in accordance with the first embodiment of the invention.
Figure 2C:
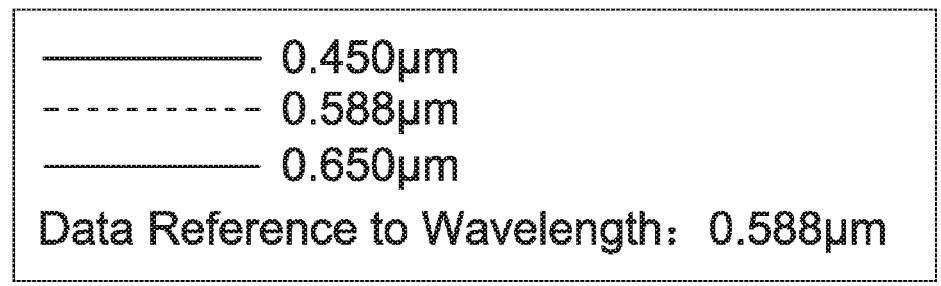
FIG. 2C is a lateral color diagram of the wide-angle lens assembly in accordance with the first embodiment of the invention.
Figure 2C:
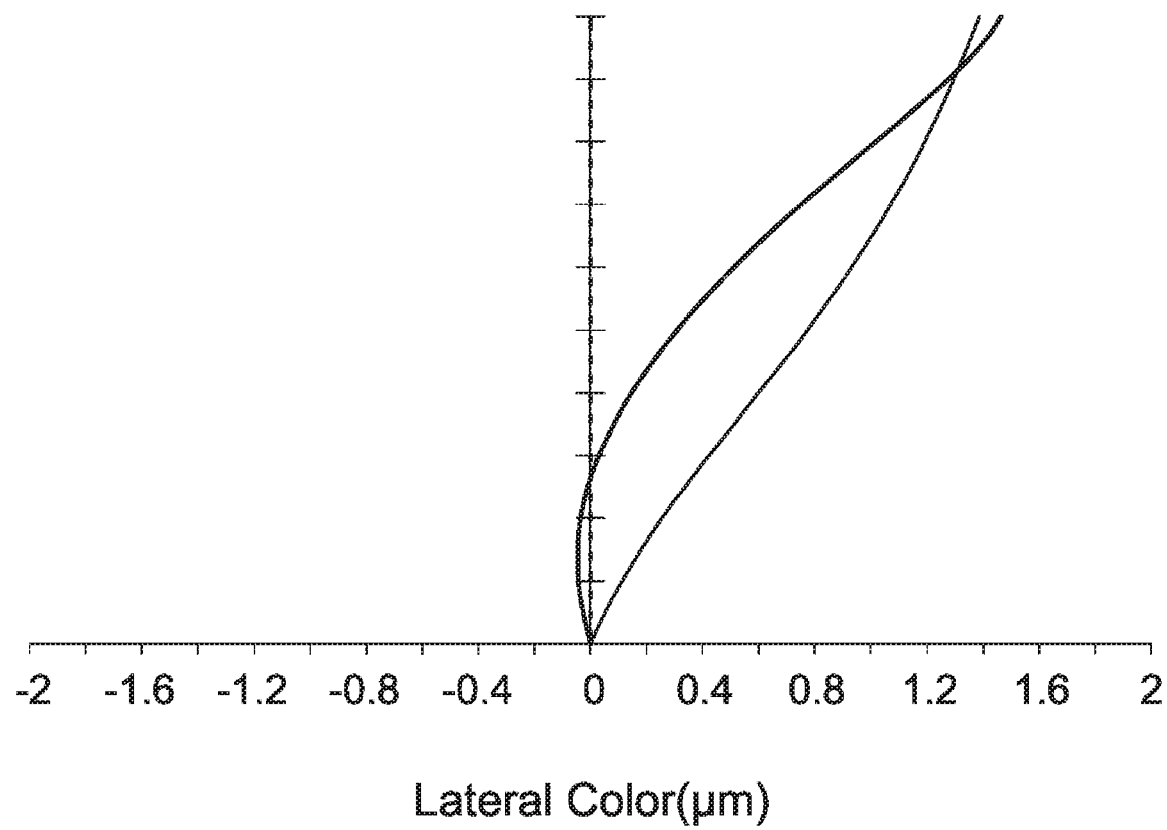

By the above arrangements of the lenses and stop ST1, the wide-angle lens assembly 1 of the first embodiment can meet the requirements of optical performance as seen in FIGS. 2A-2C.

It can be seen from FIG. 2A that the field curvature of tangential direction and sagittal direction in the wide-angle lens assembly 1 of the first embodiment ranges from −0.015 mm to 0.02 mm. It can be seen from FIG. 2B that the distortion in the wide-angle lens assembly 1 of the first embodiment ranges from −9% to 0%. It can be seen from FIG. 2C that the lateral color in the wide-angle lens assembly 1 of the first embodiment ranges from −0.1 μm to 1.5 μm.

It is obvious that the field curvature, the distortion, and the lateral color of the wide-angle lens assembly 1 of the first embodiment can be corrected effectively. Therefore, the wide-angle lens assembly 1 of the first embodiment is capable of good optical performance.

Figure 3:
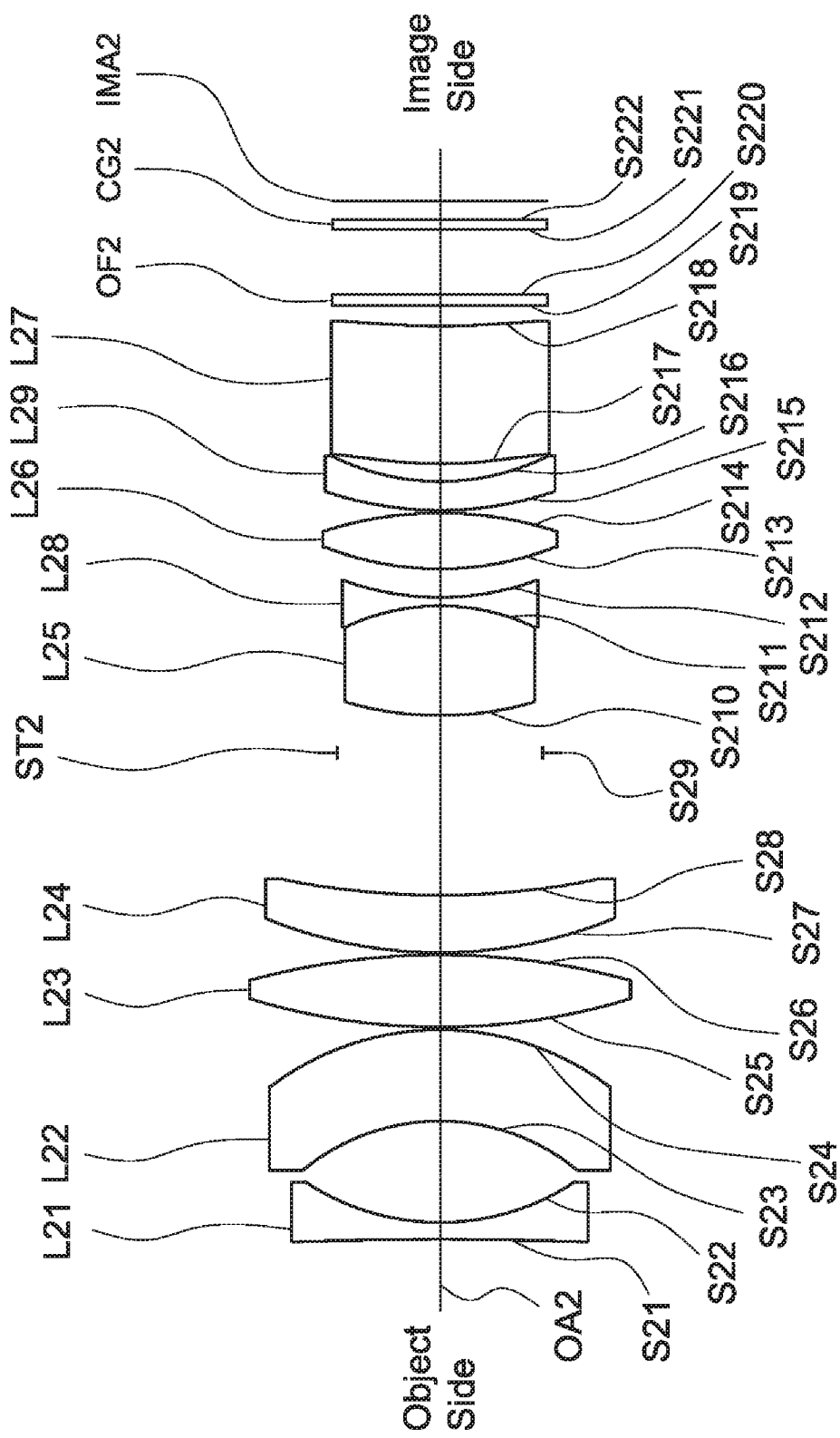
FIG. 3 is a lens layout diagram of a wide-angle lens assembly in accordance with a second embodiment of the invention.

Referring to FIG. 3, the wide-angle lens assembly 2 includes a first lens L21, a second lens L22, a third lens L23, a fourth lens L24, a stop ST2, a fifth lens L25, an eighth lens L28, a sixth lens L26, a ninth lens L29, a seventh lens L27, an optical filter OF2, and a cover glass CG2, all of which are arranged in order from an object side to an image side along an optical axis OA2. In operation, an image of light rays from the object side is formed at an image plane IMA2.

According to the foregoing, wherein: the first lens L21 is a biconcave lens, wherein the object side surface S21 is a concave surface; the object side surface S23 of the second lens L22 is a concave surface and the image side surface S24 of the second lens L22 is a convex surface; the third lens L23 is a biconvex lens with positive refractive power and made of glass material, wherein the object side surface S25 is a convex surface and the image side surface S26 is a convex surface; the fourth lens L24 is a meniscus lens, wherein the image side surface 28 is a concave surface; the object side surface S215 of the ninth lens L29 is a convex surface and the image side surface S216 of the ninth lens L29 is a concave surface; the seventh lens L27 is a meniscus lens, wherein the image side surface S218 is a concave surface and the object side surface S217 and the image side surface S218 are aspheric surfaces; both of the object side surface S219 and image side surface S220 of the optical filter OF2 are plane surfaces; and both of the object side surface S221 and image side surface S222 of the cover glass CG2 are plane surfaces.

With the above design of the lenses and stop ST2 and at least any one of the conditions (1)-(4) satisfied, the wide-angle lens assembly 2 can have an effective decreased F-number, an effective increased resolution, and an effective resisted environmental temperature change.

If the value $f_{123}/f$ of condition (3) is less than 1, it will result in poor performance and low resolution for the wide-angle lens assembly. Therefore, the value of $f_{123}/f$ must be at least greater than 1. An optimal range of $f_{123}/f$ in condition (3) is between 1 and 2.1. The performance and resolution of the wide-angle lens assembly can be improved when satisfies the condition (3): $1 < f_{1234}/f < 2.1$.

Table 3 shows the optical specification of the wide-angle lens assembly 2 in FIG. 3.

TABLE 3

Effective Focal Length = 11.43 mm F-number = 1.80
Total Lens Length = 50.38 mm Field of View = 52.85 degrees

| Surface Number | Radius of Curvature (ram) | Thickness (mm) | Nd | Vd | Effective Focal Length (mm) | Remark |
|---|---|---|---|---|---|---|
| S21 | −195.162 | 0.806 | 1.92 | 24 | −12.1269 | The First Lens L21 |
| S22 | 11.872 | 4.939 | | | | |
| S23 | −10.399 | 4.413 | 1.62 | 63.4 | −148.843 | The Second Lens L22 |
| S24 | −13.625 | 0.123 | | | | |
| S25 | 31.430 | 3.511 | 1.77 | 49.6 | 22.0414 | The Third Lens L23 |
| S26 | −35.343 | 0.117 | | | | |
| S27 | 22.335 | 2.781 | 1.95 | 18 | 52.0916 | The Fourth Lens L24 |
| S28 | 38.382 | 6.910 | | | | |
| S29 | ∞ | 1.815 | | | | Stop ST2 |
| S210 | 16.402 | 5.318 | 1.55 | 75.5 | 12.656 | The Fifth Lens L25 |
| S211 | −10.711 | 0.410 | 1.85 | 23.8 | −7.0313 | The Eighth Lens L28 |
| S212 | 13.633 | 1.403 | | | | |
| S213 | 15.594 | 2.689 | 1.7 | 55.5 | 12.514 | The Sixth Lens L26 |
| S214 | −18.379 | 0.134 | | | | |
| S215 | 17.470 | 1.398 | 1.73 | 54.7 | −54.949 | The Ninth Lens L29 |
| S216 | 11.755 | 0.862 | | | | |
| S217 | 21.574 | 6.680 | 1.81 | 25.5 | 64.1111 | The Seventh Lens L27 |
| S218 | 31.947 | 0.971 | | | | |
| S219 | ∞ | 0.550 | 1.52 | 64.2 | | Optical Filter OF2 |

TABLE 3-continued

Effective Focal Length = 11.43 mm F-number = 1.80
Total Lens Length = 50.38 mm Field of View = 52.85 degrees

| Surface Number | Radius of Curvature (ram) | Thickness (mm) | Nd | Vd | Effective Focal Length (mm) | Remark |
|---|---|---|---|---|---|---|
| S220 | ∞ | 0.146 | | | | |
| S221 | ∞ | 0.500 | 1.52 | 64.2 | | Cover Glass CG2 |
| S222 | ∞ | 0.893 | | | | |

The aspheric surface sag z of each aspheric lens in table 3 can be calculated by the following formula:

$$z = ch^2/\{1+[1-(k+1)c^2h^2]^{1/2}\} + Ah^4 + Bh^6 + Ch^8 + Dh^{10}$$

where cis curvature, his the vertical distance from the lens surface to the optical axis, k is conic constant and A, B, C, and Dare aspheric coefficients.

In the second embodiment, the conic constant k and the aspheric coefficients A, B, C, D of each aspheric lens are shown in Table 4.

TABLE 4

| Surface Number | k | A | B | C | D |
|---|---|---|---|---|---|
| S217 | −8.41418025 | −7.3915E−05 | −1.27118E−06 | −4.03905E−08 | 0 |
| S218 | −12.0966342 | −0.00014424 | −2.776E−06 | 1.45412E−08 | 0 |

Table 5 shows the parameters and condition values for conditions (1)-(4) in accordance with the second embodiment of the invention. It can be seen from Table 5 that the wide-angle lens assembly 2 of the second embodiment satisfies the conditions (1)-(4).

TABLE 5

| A | 9.962 mm | IH | 5.175 mm | $f_{1234}$ | 22.5744 mm |
|---|---|---|---|---|---|
| f/TTL | 0.23 | $T_{RL1}/T_1$ | 8.29 | $f_{1234}/f$ | 1.98 |
| A/IH | 1.93 | | | | |

Figure 4A:
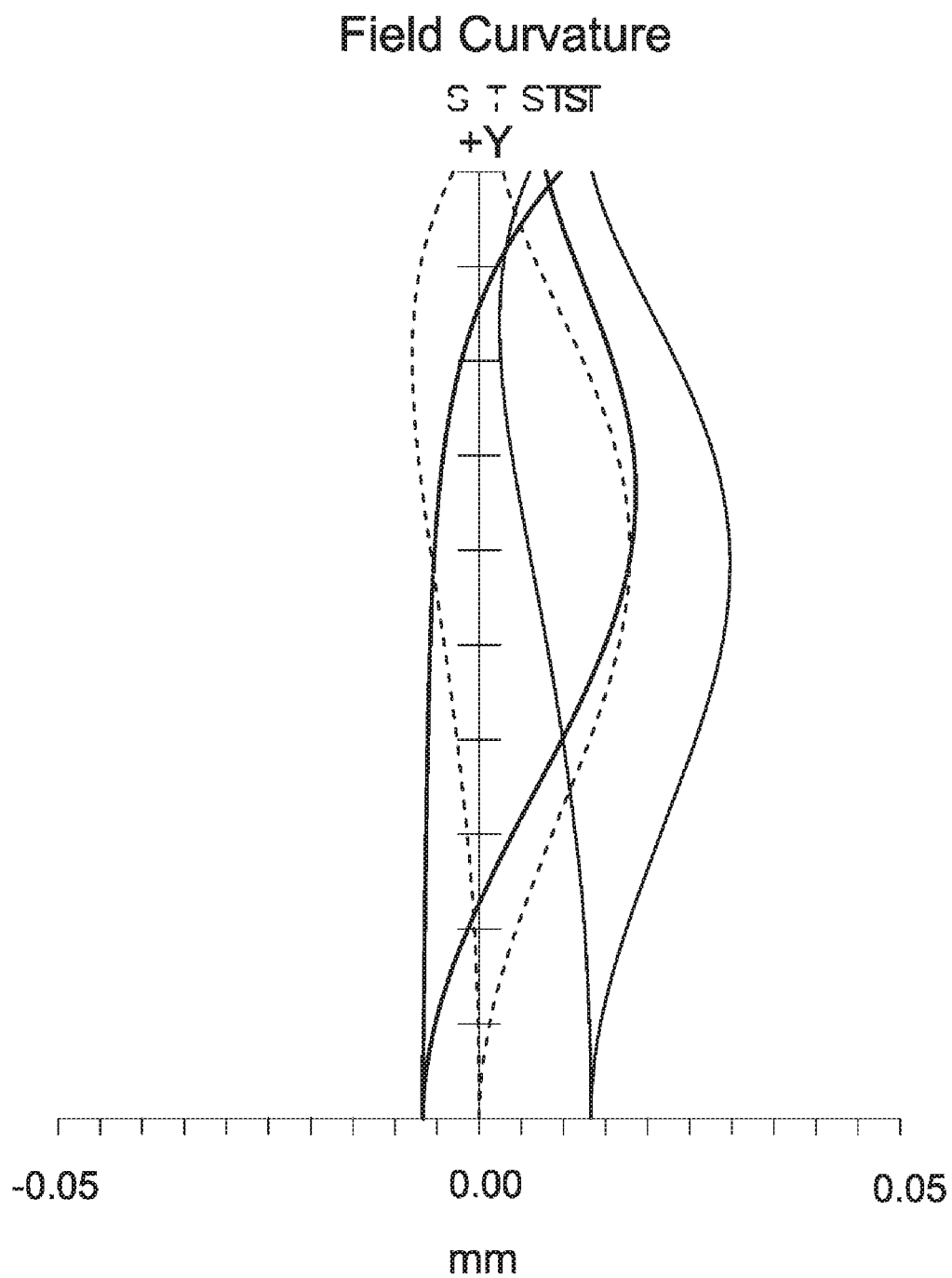
FIG. 4A depicts a field curvature diagram of the wide-angle lens assembly in accordance with the second embodiment of the invention.
Figure 4B:
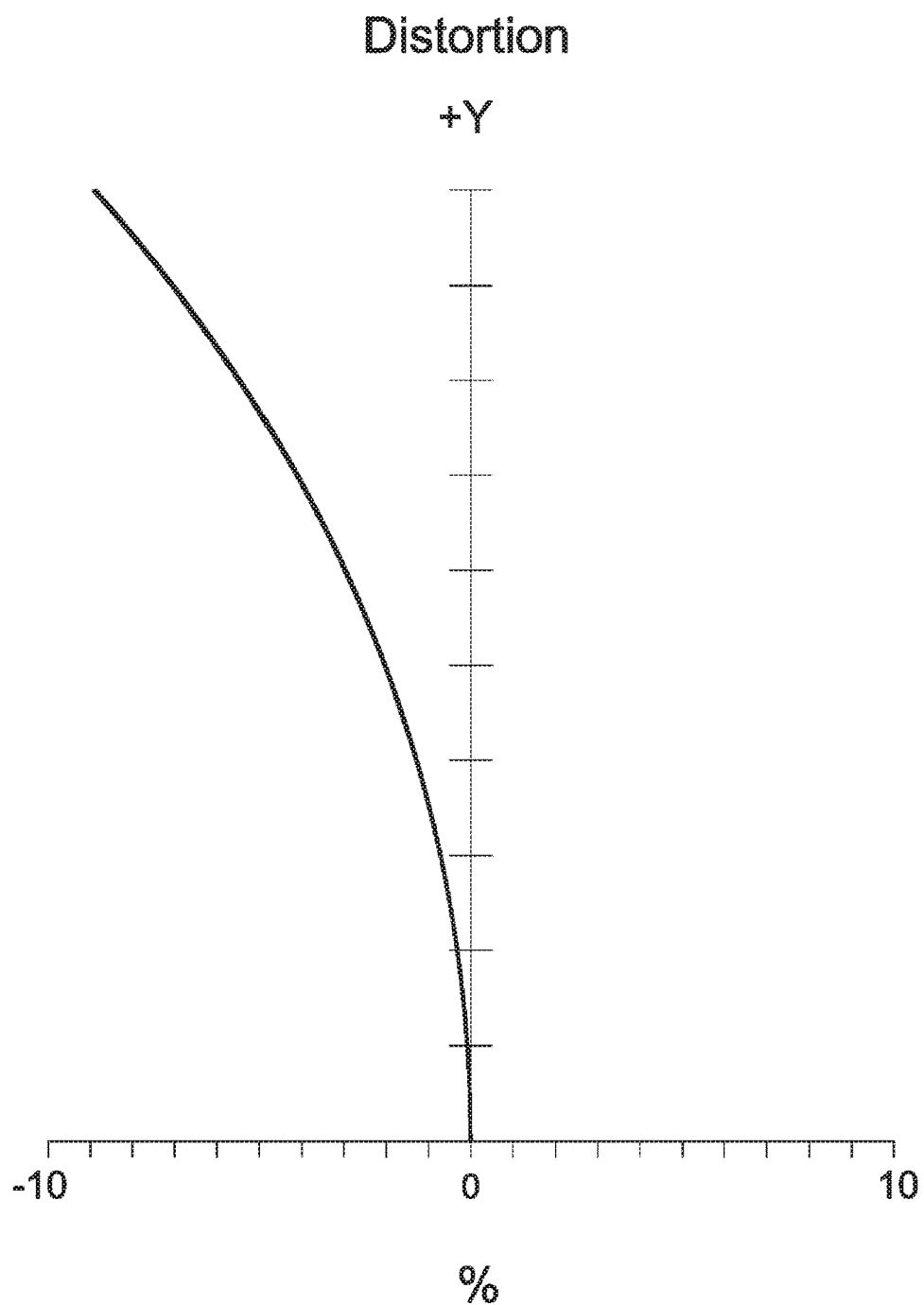
FIG. 4B is a distortion diagram of the wide-angle lens assembly in accordance with the second embodiment of the invention.
Figure 4C:
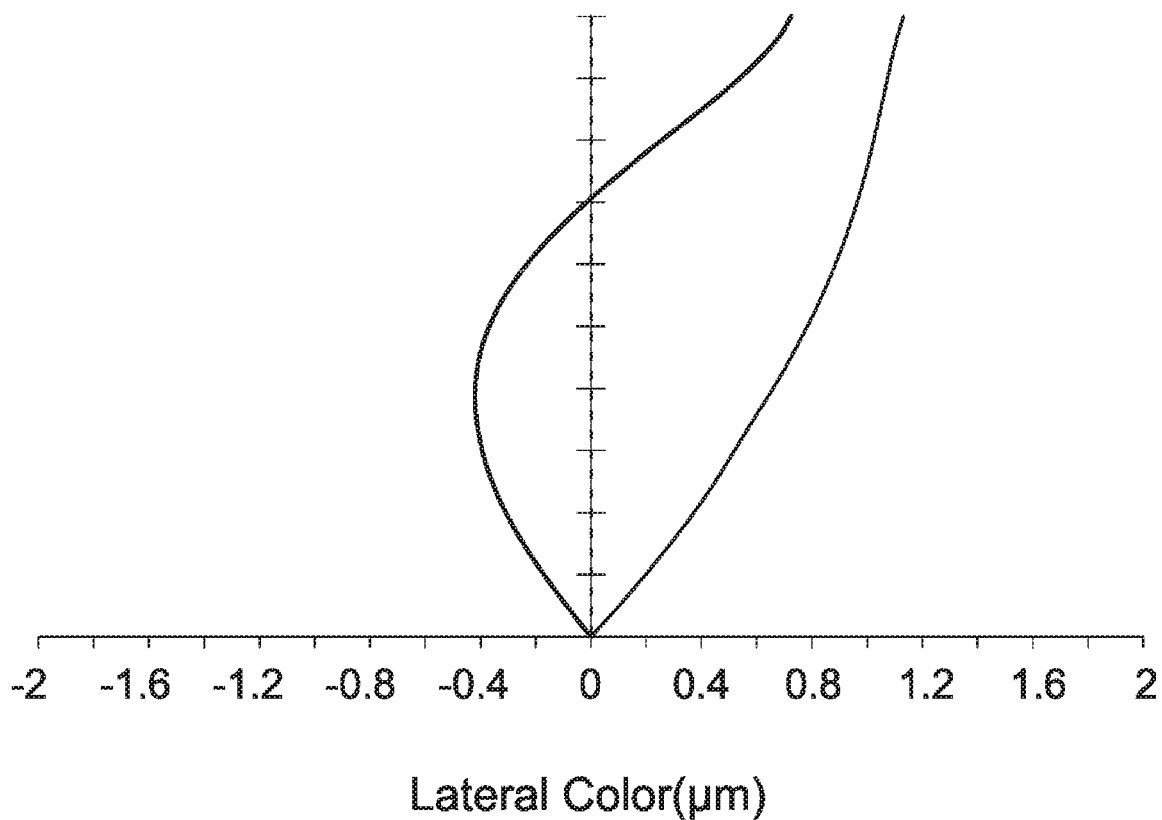
FIG. 4C is a lateral color diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C.

It can be seen from FIG. 4A that the field curvature of tangential direction and sagittal direction in the wide-angle lens assembly 2 of the second embodiment ranges from −0.01 mm to 0.03 mm. It can be seen from FIG. 4B that the distortion in the wide-angle lens assembly 2 of the second embodiment ranges from −9% to 0%. It can be seen from FIG. 4C that the lateral color in the wide-angle lens assembly 2 of the second embodiment ranges from −0.5 μm to 1.1 μm.

It is obvious that the field curvature, the distortion, and the lateral color of the wide-angle lens assembly 2 of the second embodiment can be corrected effectively. Therefore, the wide-angle lens assembly 2 of the second embodiment is capable of good optical performance.

Figure 5:
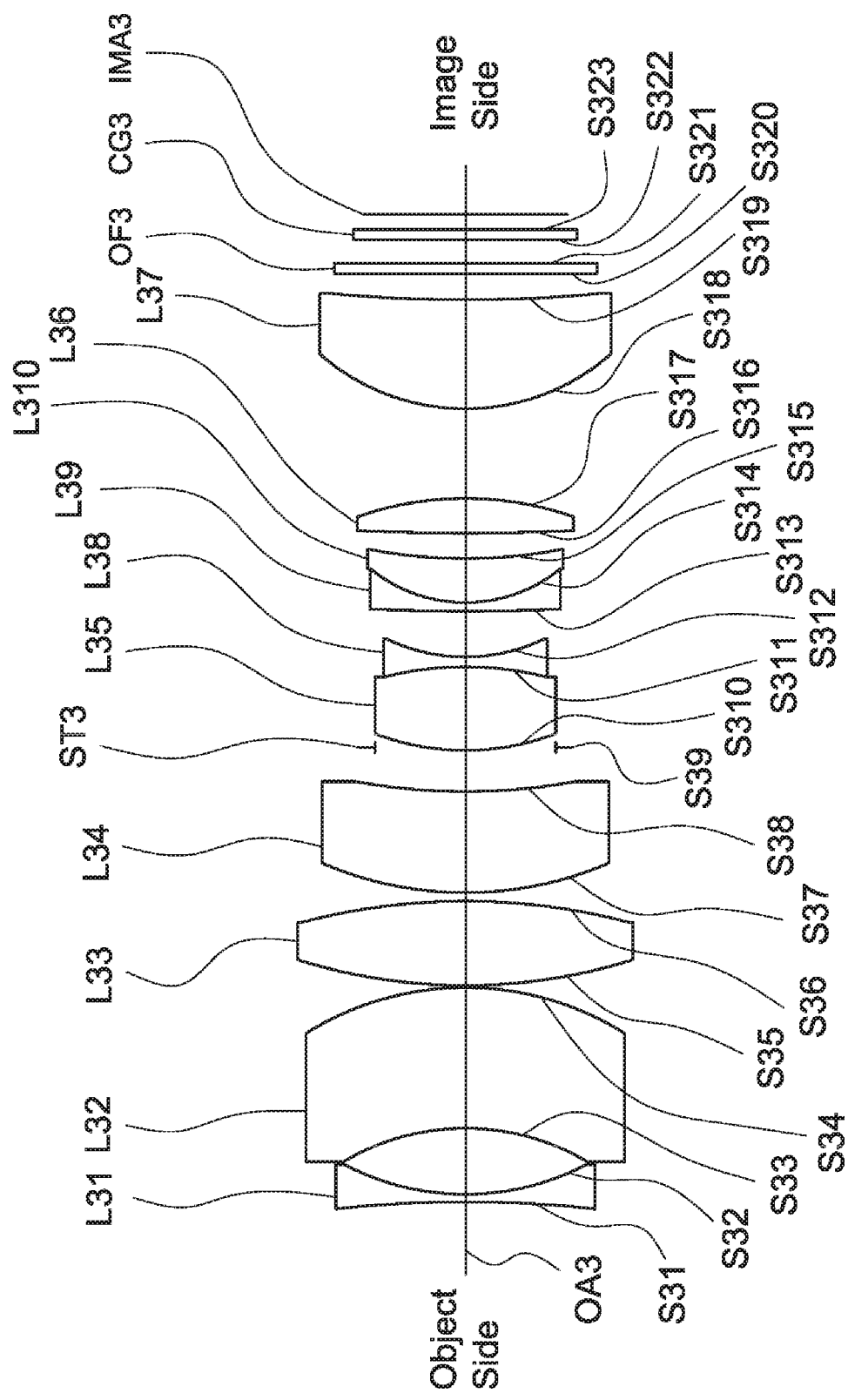
FIG. 5 is a lens layout diagram of a wide-angle lens assembly in accordance with a third embodiment of the invention.

Referring to FIG. 5, the wide-angle lens assembly 3 includes a first lens L31, a second lens L32, a third lens L33, a fourth lens L34, a stop ST3, a fifth lens L35, an eighth lens L38, a ninth lens L39, a tenth lens L310, a sixth lens L36, a seventh lens L37, an optical filter OF3, and a cover glass CG3, all of which are arranged in order from an object side to an image side along an optical axis OA3. In operation, an image of light rays from the object side is formed at an image plane IMA3.

According to the foregoing, wherein: the first lens L31 is a biconcave lens, wherein the object side surface S31 is a concave surface; the object side surface S33 of the second lens L32 is a concave surface and the image side surface S34 of the second lens L32 is a convex surface; the third lens L33 is a biconvex lens with positive refractive power and made of glass material, wherein the object side surface S35 is a convex surface and the image side surface S36 is a convex surface; the fourth lens L34 is a meniscus lens, wherein the image side surface S38 is a concave surface; the object side surface S313 of the ninth lens L39 is a convex surface and the image side surface S314 of the ninth lens L39 is a concave surface; the tenth lens L310 is a meniscus lens with positive refractive power and made of glass material, wherein the object side surface S314 is a convex surface, the image side surface S315 is a concave surface, and the object side surface S314 and the image side surface S315 are spherical surfaces; the seventh lens L37 is a meniscus lens, wherein the image side surface S319 is a concave surface and the object side surface S318 and the image side surface S319 are aspheric surfaces; the tenth lens L310 and the ninth lens L39 are cemented; both of the object side surface S320 and image side surface S321 of the optical filter OF3 are plane surfaces; and both of the object side surface S322 and image side surface S323 of the cover glass CG3 are plane surfaces.

With the above design of the lenses and stop ST3 and at least any one of the conditions (1)-(4) satisfied, the wide-angle lens assembly 3 can have an effective decreased F-number, an effective increased resolution, and an effective resisted environmental temperature change.

Table 6 shows the optical specification of the wide-angle lens assembly 3 in FIG. 5.

TABLE 6

Effective Focal Length = 11.44 mm F-number = 1.85
Total Lens Length = 50.28 mm Field of View = 52.846 degrees

| Surface Number | Radius of Curvature (mm) | Thickness (mm) | Nd | Vd | Effective Focal Length (mm) | Remark |
|---|---|---|---|---|---|---|
| S31 | −62.751 | 0.410 | 1.92 | 23.9 | −11.9307 | The First Lens L31 |
| S32 | 13.363 | 3.347 | | | | |
| S33 | −12.161 | 7.171 | 1.62 | 64.3 | −880.849 | The Second Lens L32 |
| S34 | −15.245 | 0.100 | | | | |
| S35 | 28.316 | 4.302 | 1.77 | 49.7 | 20.1521 | The Third Lens L33 |
| S36 | −32.287 | 0.433 | | | | |
| S37 | 18.549 | 5.139 | 1.95 | 18 | 40.5759 | The Fourth Lens L34 |
| S38 | 31.067 | 2.250 | | | | |
| S39 | ∞ | −0.158 | | | | Stop ST3 |
| S310 | 12.741 | 4.260 | 1.55 | 75.5 | 13.8049 | The Fifth Lens L35 |

TABLE 6-continued

Effective Focal Length = 11.44 mm F-number = 1.85
Total Lens Length = 50.28 mm Field of View = 52.846 degrees

| Surface Number | Radius of Curvature (mm) | Thickness (mm) | Nd | Vd | Effective Focal Length (mm) | Remark |
|---|---|---|---|---|---|---|
| S311 | −16.582 | 0.505 | 1.85 | 23.8 | −6.9495 | The Eighth Lens L38 |
| S312 | 9.246 | 2.311 | | | | |
| S313 | 106.080 | 0.450 | 1.81 | 25.4 | −10.264 | The Ninth Lens L39 |
| S314 | 7.652 | 2.239 | 1.83 | 42.7 | 12.3768 | The Tenth Lens L310 |
| S315 | 25.574 | 1.298 | | | | |
| S316 | 125.763 | 1.741 | 1.59 | 68.6 | 25.3781 | The Sixth Lens L36 |
| S317 | −17.000 | 4.580 | | | | |
| S318 | 11.217 | 5.557 | 1.77 | 49.6 | 16.7102 | The Seventh Lens L37 |
| S319 | 67.132 | 1.312 | | | | |
| S320 | ∞ | 0.550 | 1.52 | 64.2 | | Optical Filter OF3 |
| S321 | ∞ | 0.146 | | | | |
| S322 | ∞ | 0.500 | 1.52 | 64.2 | | Cover Glass CG3 |
| S323 | ∞ | 0.893 | | | | |

The definition of aspheric surface sag z of each aspheric lens in table 6 is the same as that of in Table 3, and is not described here again.

In the third embodiment, the conic constant k and the aspheric coefficients A, B, C, D of each aspheric surface are shown in Table 7.

TABLE 7

| Surface Number | k | A | B | C | D |
|---|---|---|---|---|---|
| S318 | 0.008483281 | −2.84479E−06 | 4.4325E−08 | −1.02505E−10 | 6.29549E−12 |
| S319 | 5.000882367 | −4.72369E−07 | −5.8135E−07 | 2.44779E−09 | 3.64253E−11 |

Table 8 shows the parameters and condition values for conditions (1)-(4) in accordance with the third embodiment of the invention. It can be seen from Table 8 that the wide-angle lens assembly 3 of the third embodiment satisfies the conditions (1)-(4).

TABLE 8

| A | 9.197 mm | IH | 5.175 mm | $f_{1234}$ | 12.1991 mm |
|---|---|---|---|---|---|
| f/TTL | 0.23 | $T_{RL1}/T_1$ | 13.55 | $f_{1234}/f$ | 1.07 |
| A/IH | 1.78 | | | | |

Figure 6A:
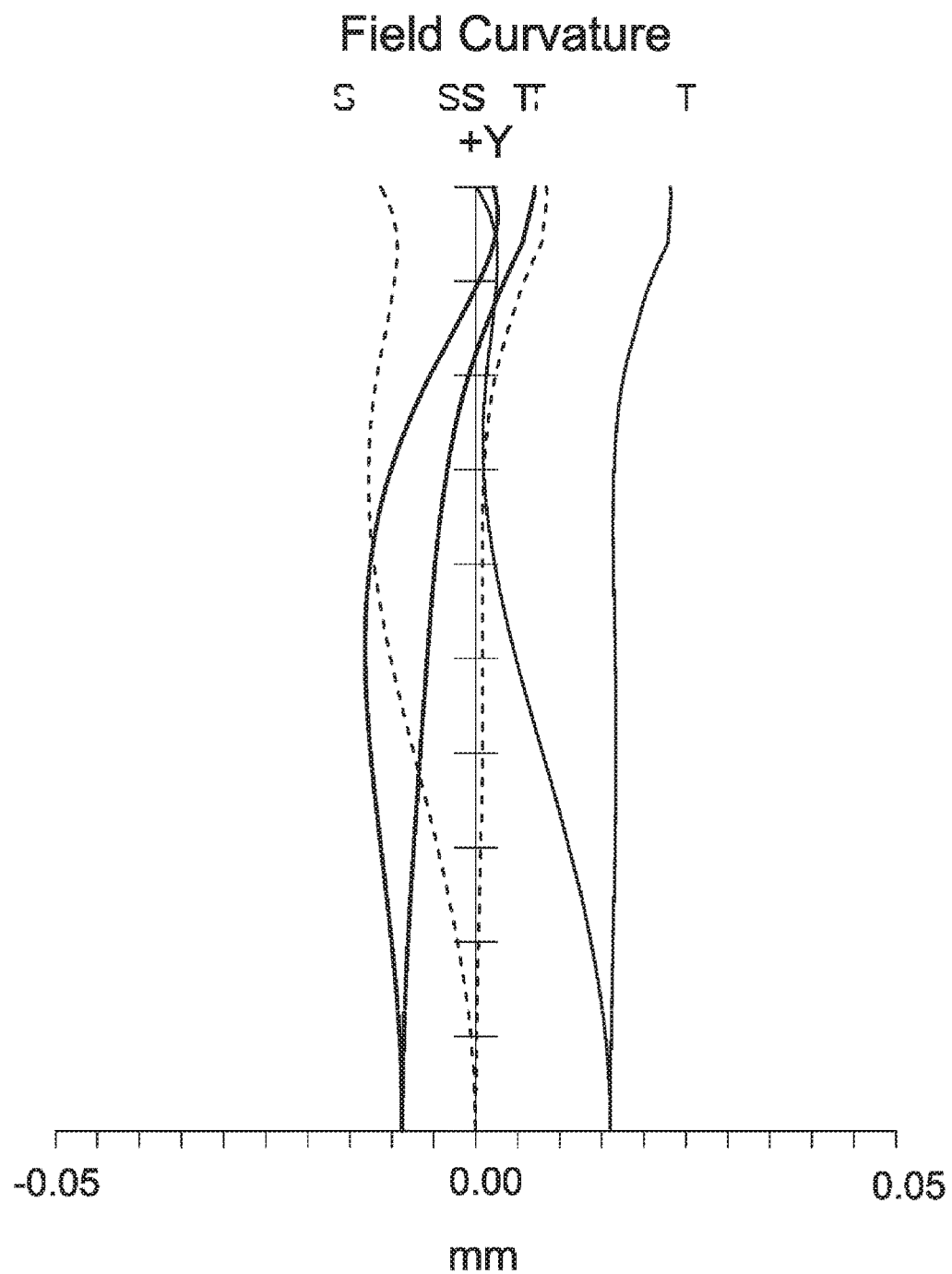
FIG. 6A depicts a field curvature diagram of the wide-angle lens assembly in accordance with the third embodiment of the invention.
Figure 6B:
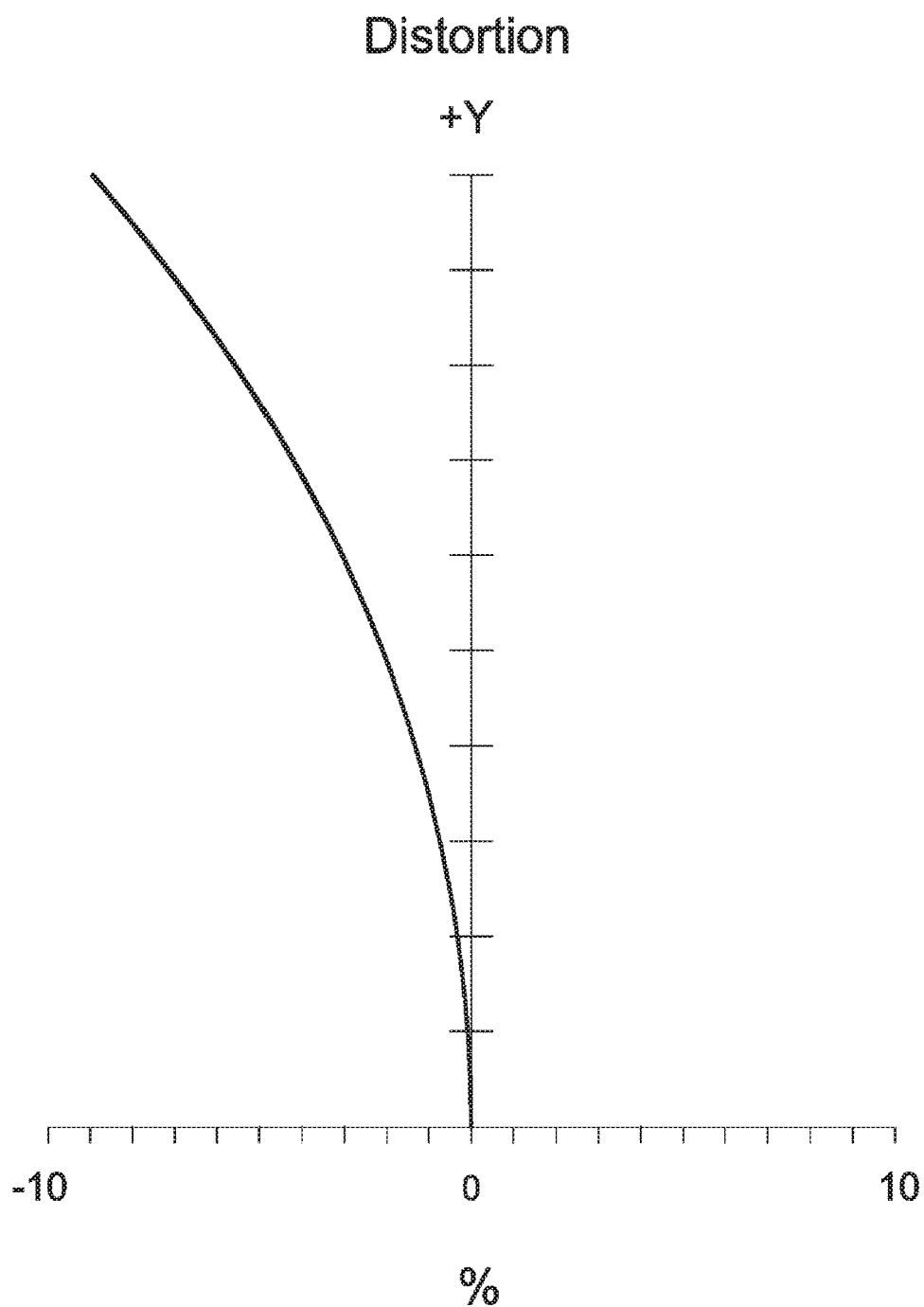
FIG. 6B is a distortion diagram of the wide-angle lens assembly in accordance with the third embodiment of the invention.
Figure 6C:
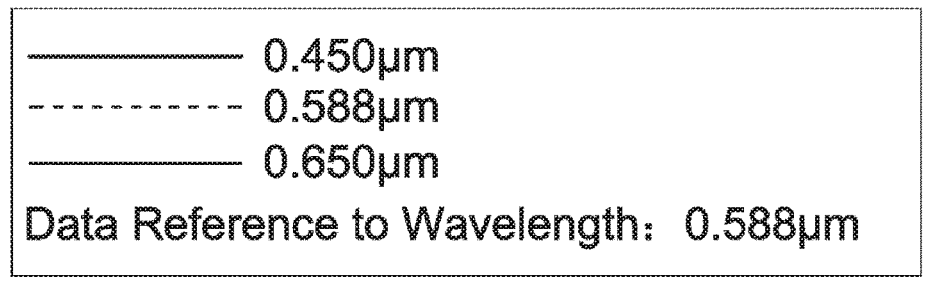
FIG. 6C is a lateral color diagram of the wide-angle lens assembly in accordance with the third embodiment of the invention.
Figure 6C:
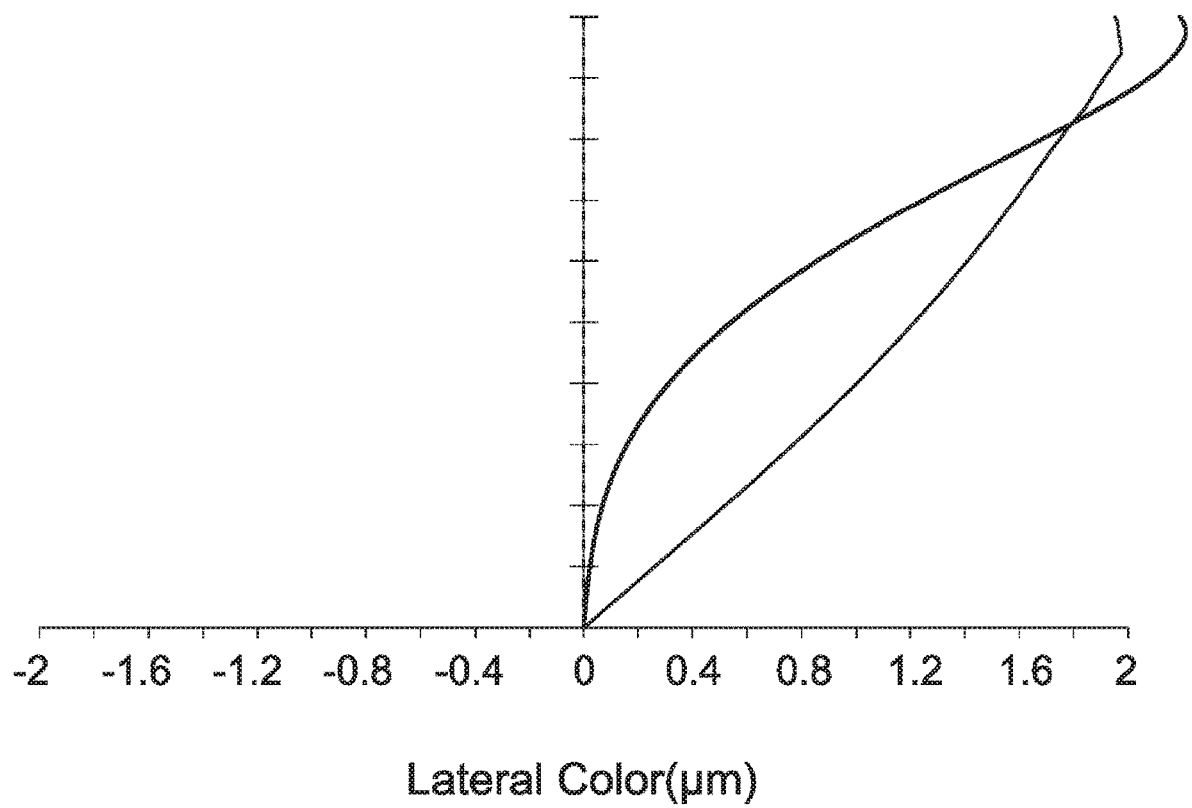

By the above arrangements of the lenses and stop ST3, the wide-angle lens assembly 3 of the third embodiment can meet the requirements of optical performance as seen in FIGS. 6A-6C.

It can be seen from FIG. 6A that the field curvature of tangential direction and sagittal direction in the wide-angle lens assembly 3 of the third embodiment ranges from −0.015 mm to 0.025 mm. It can be seen from FIG. 6B that the distortion in the wide-angle lens assembly 3 of the third embodiment ranges from −9% to 0%. It can be seen from FIG. 6C that the lateral color in the wide-angle lens assembly 3 of the third embodiment ranges from 0 μm to 2.2 μm.

It is obvious that the field curvature, the distortion, and the lateral color of the wide-angle lens assembly 3 of the third embodiment can be corrected effectively. Therefore, the wide-angle lens assembly 3 of the third embodiment is capable of good optical performance.

Figure 7:
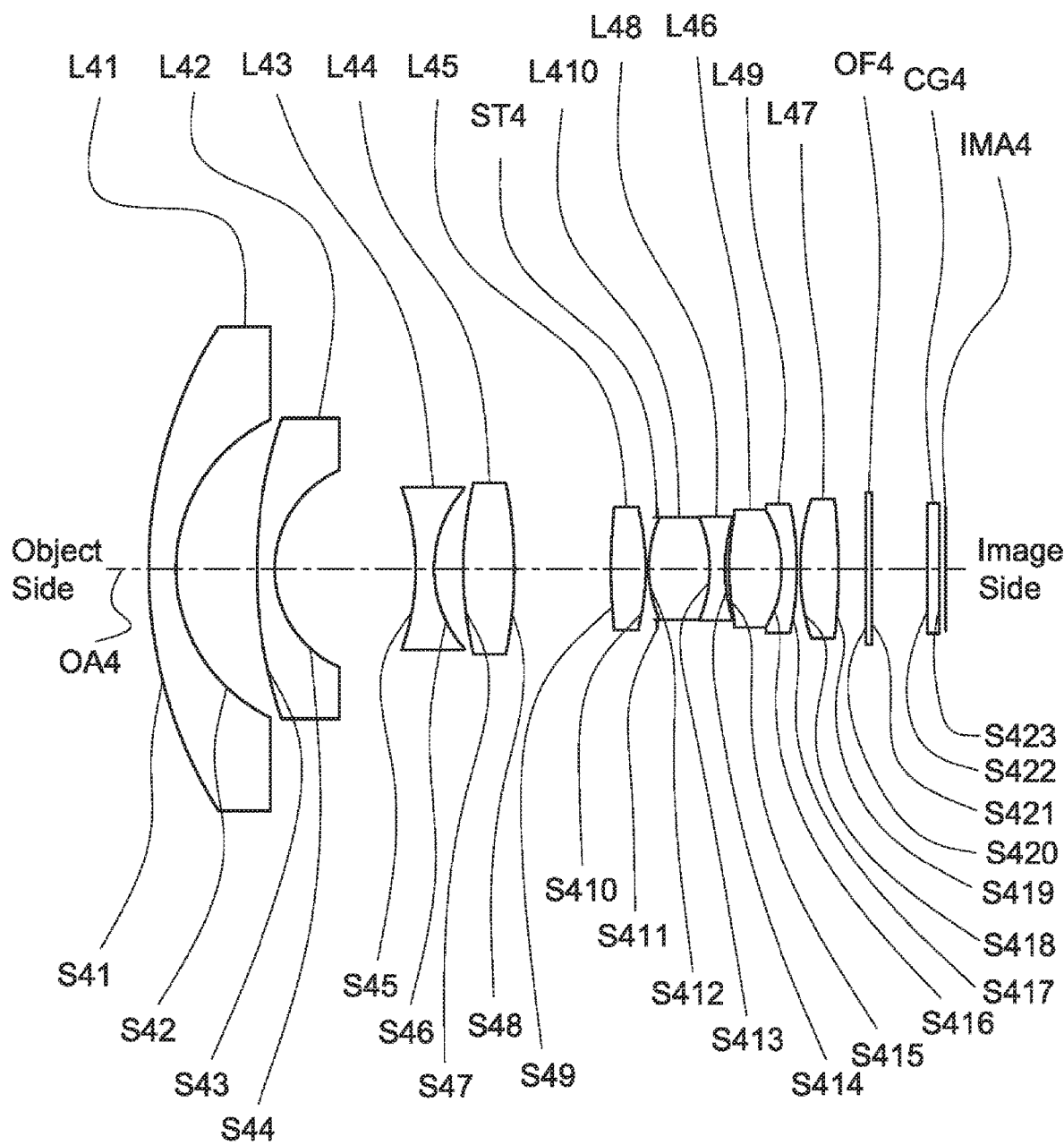
FIG. 7 is a lens layout diagram of a wide-angle lens assembly in accordance with a fourth embodiment of the invention.

Referring to FIG. 7, the wide-angle lens assembly 4 includes a first lens L41, a second lens L42, a third lens L43, a fourth lens L44, a fifth lens L45, a stop ST4, a tenth lens L410, an eighth lens L48, a sixth lens L46, a ninth lens L49, a seventh lens L47, an optical filter OF4, and a cover glass CG4, all of which are arranged in order from an object side to an image side along an optical axis OA4. In operation, an image of light rays from the object side is formed at an image plane IMA4.

According to the foregoing, wherein: the first lens L41 is a meniscus lens, wherein the object side surface S41 is a convex surface; the object side surface S43 of the second lens L42 is a convex surface and the image side surface S44 of the second lens L42 is a concave surface; the third lens L43 is a biconcave lens with negative refractive power and made of glass material, wherein the object side surface S45 is a concave surface and the image side surface S46 is a concave surface; the fourth lens L44 is a biconvex lens, wherein the image side surface 48 is a convex surface; the tenth lens L410 is a biconvex lens with positive refractive power and made of glass material, wherein the object side surface S412 is a convex surface, the image side surface S413 is a convex surface, and the object side surface S412 and the image side surface S413 are spherical surfaces; the object side surface S416 of the ninth lens L49 is a concave surface and the image side surface S417 of the ninth lens L49 is a convex surface; the seventh lens L47 is a biconvex lens, wherein the image side surface S419 is a convex surface and the object side surface S418 and the image side surface S419 are spherical surfaces; the ninth lens L49 and the sixth lens L46 are cemented; both of the object side surface S420 and image side surface S421 of the optical filter OF4 are plane surfaces; and both of the object side surface S422 and image side surface S423 of the cover glass CG4 are plane surfaces.

With the above design of the lenses and stop ST4 and at least any one of the conditions (5)-(12) satisfied, the wide-angle lens assembly 4 can have an effective shortened total lens length, an effective increased field of view, an effective increased brightness, an effective increased resolution, an effective resisted environmental temperature change, an effective increased resolution, an effective corrected aberration, and is capable of an effective corrected chromatic aberration.

Table 9 shows the optical specification of the wide-angle lens assembly 4 in FIG. 7.

TABLE 9

Effective Focal Length = 1.245 mm F-number = 1.6
Total Lens Length = 26.118 mm Field of View = 181.500 degrees

| Surface Number | Radius of Curvature (ram) | Thickness (mm) | Nd | Vd | Effective Focal Length (mm) | Remark |
|---|---|---|---|---|---|---|
| S41 | 15.000 | 0.900 | 1.835 | 42.7 | −13.2954 | The First Lens L41 |

TABLE 9-continued

Effective Focal Length = 1.245 mm F-number = 1.6
Total Lens Length = 26.118 mm Field of View = 181.500 degrees

| Surface Number | Radius of Curvature (ram) | Thickness (mm) | Nd | Vd | Effective Focal Length (mm) | Remark |
|---|---|---|---|---|---|---|
| S42 | 5.421 | 2.647 | | | | |
| S43 | 15.235 | 0.600 | 1.883 | 40.8 | −5.3536 | The Second Lens L42 |
| S44 | 3.553 | 4.606 | | | | |
| S45 | −8.305 | 0.600 | 1.487 | 70.2 | −6.0388 | The Third Lens L43 |
| S46 | 4.081 | 0.953 | | | | |
| S47 | 12.000 | 1.668 | 1.847 | 23.8 | 6.8083 | The Fourth Lens L44 |
| S48 | −15.000 | 3.182 | | | | |
| S49 | 20.000 | 1.139 | 1.741 | 52.6 | 10.7961 | The Fifth Lens L45 |
| S410 | −8.131 | 0.367 | | | | |
| S411 | ∞ | −0.269 | | | | Stop ST4 |
| S412 | 4.315 | 1.991 | 1.497 | 81.5 | 4.6915 | The Tenth Lens L410 |
| S413 | −4.315 | 0.500 | 1.847 | 23.8 | −2.7988 | The Eighth Lens L48 |
| S414 | 5.629 | 0.141 | | | | |
| S415 | 9.615 | 1.731 | 1.497 | 81.5 | 5.6354 | The Sixth Lens L46 |
| S416 | −3.727 | 0.500 | 1.835 | 42.7 | −25.8055 | The Ninth Lens L49 |
| S417 | −10.000 | 0.100 | | | | |
| S418 | 7.484 | 1.259 | 1.835 | 42.7 | 8.2361 | The Seventh Lens L47 |
| S419 | −20.000 | 0.887 | | | | |
| S420 | ∞ | 0.210 | 1.517 | 64.2 | | Optical Filter OF4 |
| S421 | ∞ | 1.806 | | | | |
| S422 | ∞ | 0.400 | 1.517 | 64.2 | | Cover Glass CG4 |
| S423 | ∞ | 0.200 | | | | |

Table 10 shows the parameters and condition values for conditions (5)(12) in accordance with the fourth embodiment of the invention. It can be seen from Table 10 that the wide-angle lens assembly 4 of the fourth embodiment satisfies the conditions (5)-(12).

TABLE 10

| IH | 1.875 mm | A | 3.342 mm | IH | 1.875 mm |
|---|---|---|---|---|---|
| f/IH | 0.664 | $R_{21} - R_{22}$ | 11.682 mm | $R_{31}/R_{32}$ | −2.035 |
| $(f_3 + f_{RL1})/f$ | 1.765 | $Vd_5/Nd_5$ | 30.213 | $\mid f_1/f \mid$ | 10.679 |
| $R_{RL21} + R_{RL22}$ | −13.727 mm | A/IH | 1.78 | | |

Figure 8A:
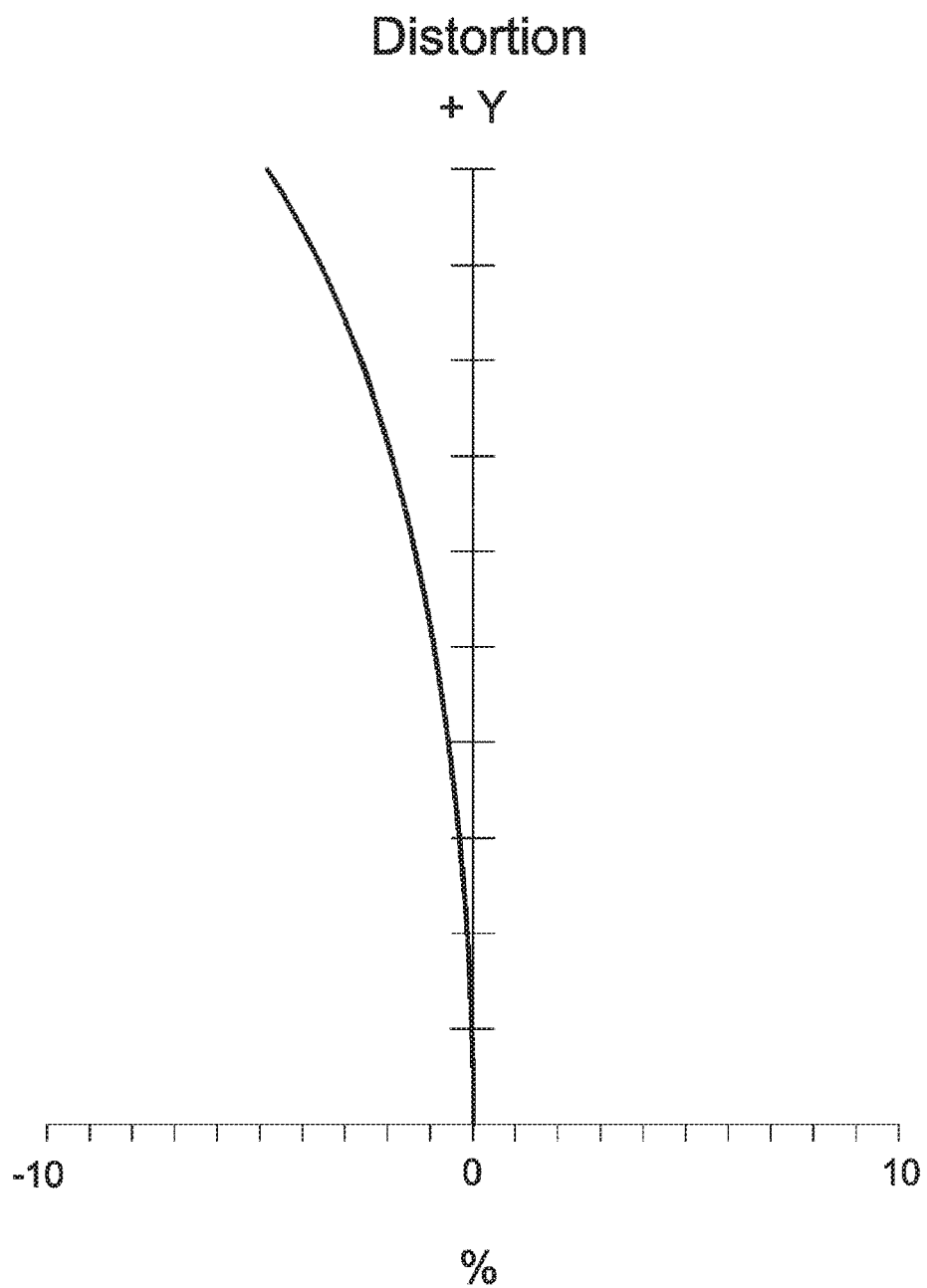
FIG. 8A depicts a distortion diagram of the wide-angle lens assembly in accordance with the fourth embodiment of the invention.
Figure 8B:
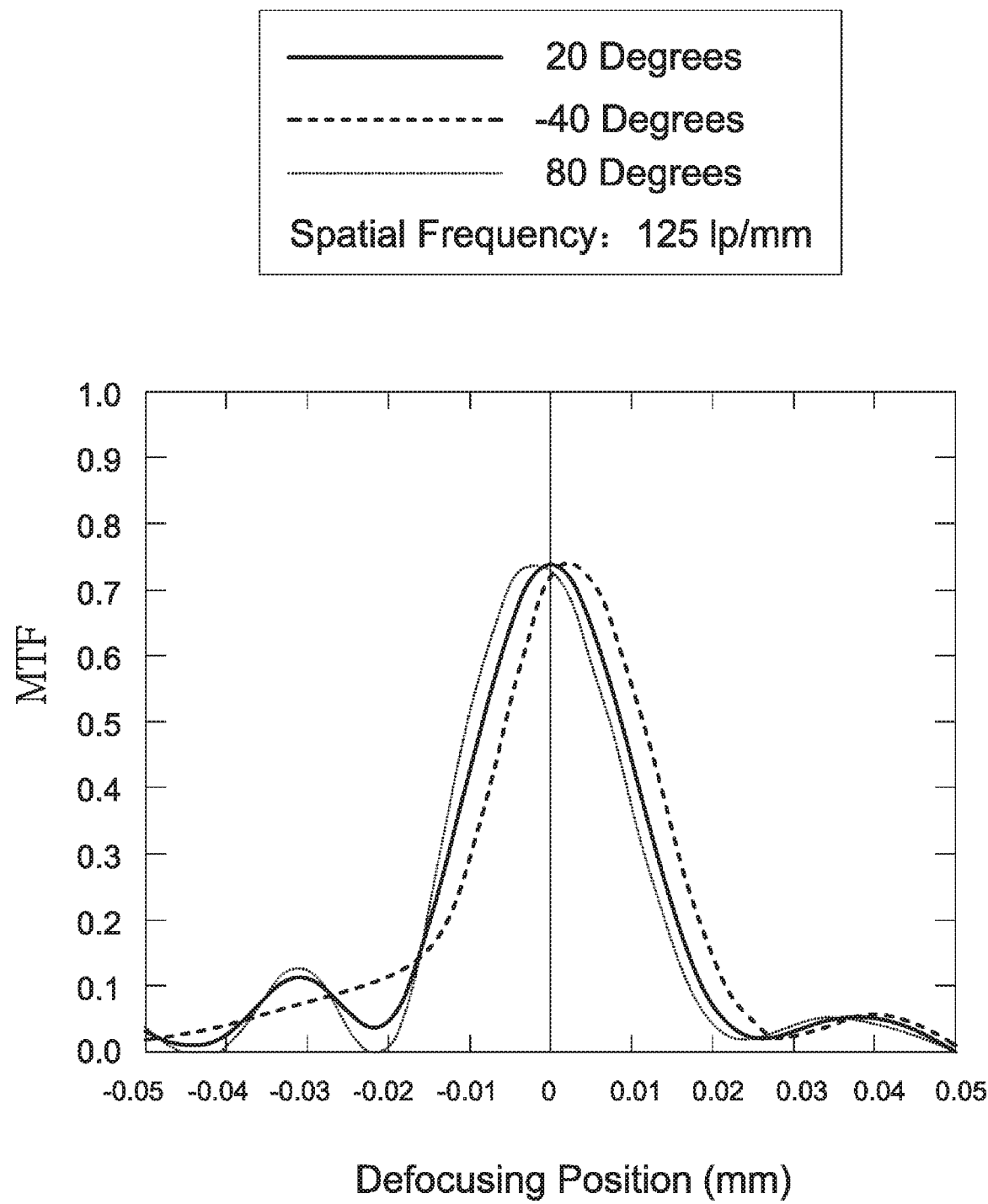
FIG. 8B is a through focus modulation transfer function diagram of the wide-angle lens assembly in accordance with the fourth embodiment of the invention when temperature is equal to $-40°$ C., $20°$ C., $80°$ C. respectively.
Figure 8C:
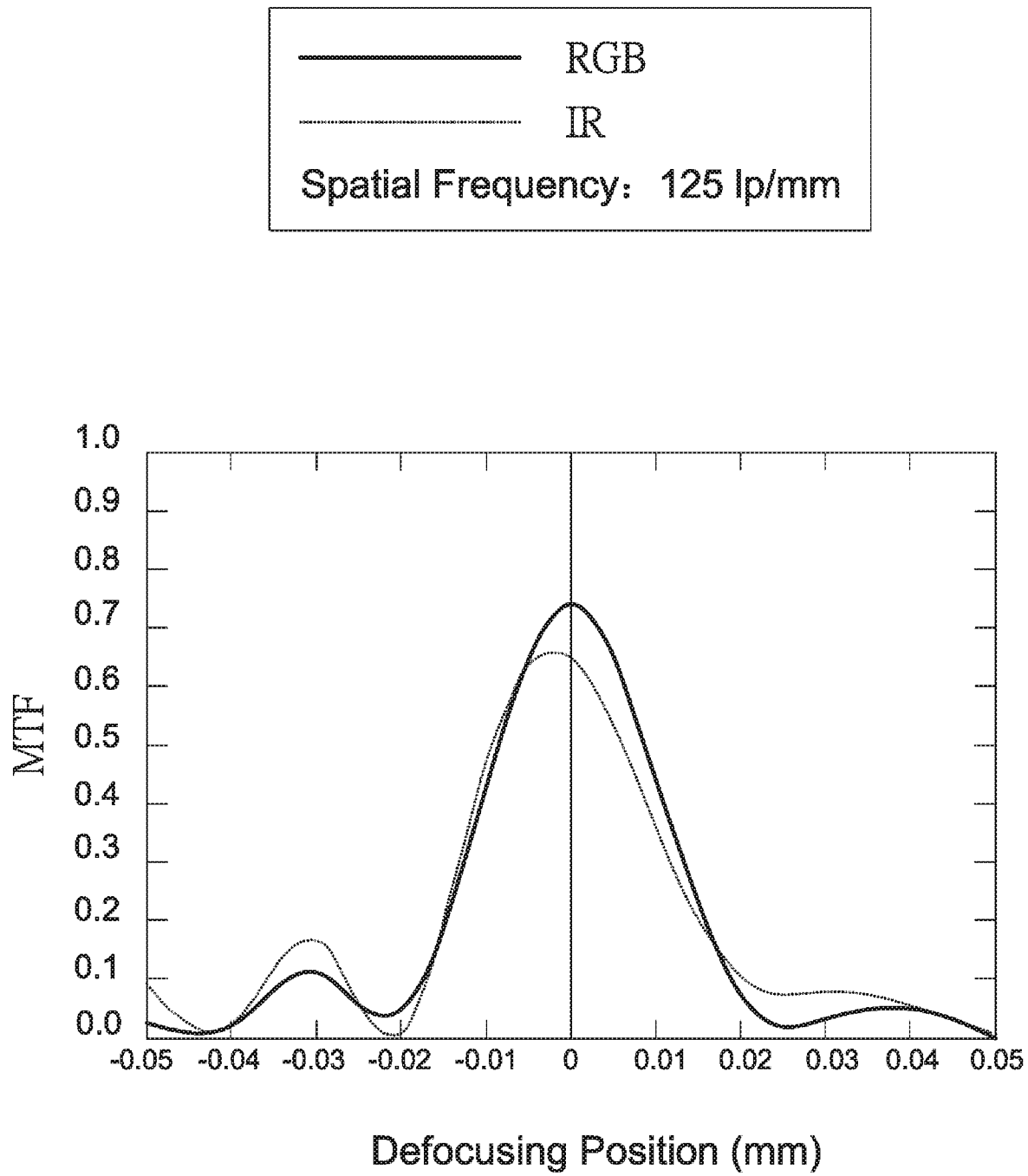
FIG. 8C is a through focus modulation transfer function diagram of the wide-angle lens assembly in accordance with the fourth embodiment of the invention when wavelength band is red-green-blue light, infrared light respectively.

By the above arrangements of the lenses and stop ST4, the wide-angle lens assembly 4 of the fourth embodiment can meet the requirements of optical performance as seen in FIGS. 8A-8C.

It can be seen from FIG. 8A that the distortion in the wide-angle lens assembly 4 of the fourth embodiment ranges from −5% to 0%. It can be seen from FIG. 8B that the through focus modulation transfer function in the lens assembly 4 of the fourth embodiment ranges from 0 to 0.75 as focus shift ranges from −0.05 mm to 0.05 mm when temperature is equal to −20° C., 40° C., 80° C. respectively. It can be seen from FIG. 8C that the modulation transfer function in the lens assembly 4 of the fourth embodiment ranges from 0.0 to 0.74 as focus shift ranges from −0.05 mm to 0.05 mm when wavelength band is red-green-blue light, infrared light respectively.

It is obvious that the distortion of the wide-angle lens assembly 4 of the fourth embodiment can be corrected effectively, and the depth of focus of high temperature, low temperature, visible light, and infrared light for the lens assembly 4 of the fourth embodiment can meet the requirement. Therefore, the wide-angle lens assembly 4 of the fourth embodiment is capable of good optical performance.

Figure 9:
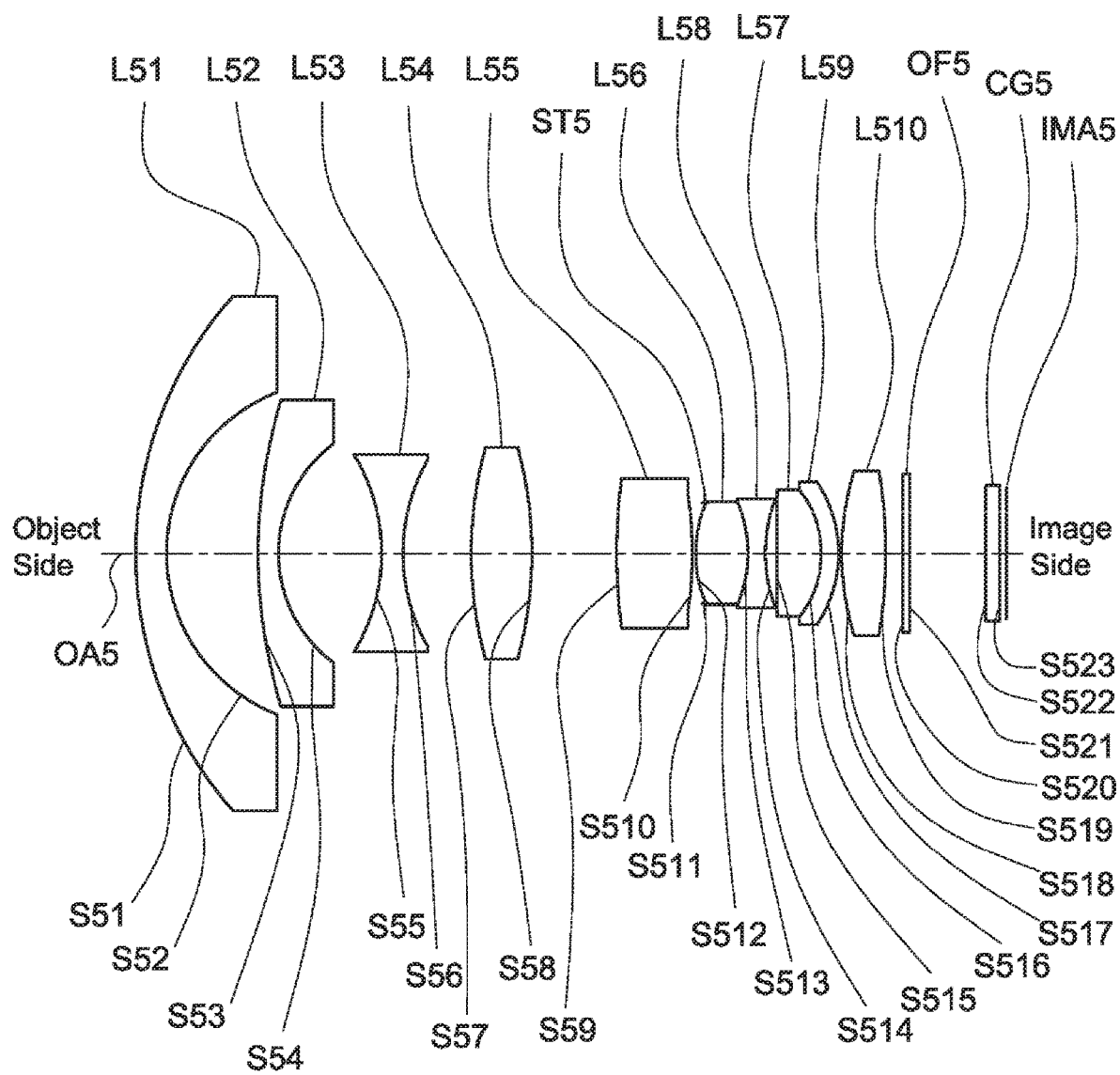
FIG. 9 is a lens layout diagram of a wide-angle lens assembly in accordance with a fifth embodiment of the invention.

Referring to FIG. 9, the wide-angle lens assembly 5 includes a first lens L51, a second lens L52, a third lens L53, a fourth lens L54, a fifth lens L55, a stop ST5, a sixth lens L56, an eighth lens L58, a seventh lens L57, a ninth lens L59, a tenth lens L510, an optical filter OF5, and a cover glass CG5, all of which are arranged in order from an object side to an image side along an optical axis OA5. In operation, an image of light rays from the object side is formed at an image plane IMA5.

According to the foregoing, wherein: the first lens L51 is a meniscus lens, wherein the object side surface S51 is a convex surface; the object side surface S53 of the second lens L52 is a convex surface and the image side surface S54 of the second lens L52 is a concave surface; the third lens L53 is a biconcave lens with negative refractive power and made of glass material, wherein the object side surface S55 is a concave surface and the image side surface S56 is a concave surface; the fourth lens L54 is a biconvex lens, wherein the image side surface S58 is a convex surface; the seventh lens L57 is a biconvex lens, wherein the image side surface S516 is a convex surface and the object side surface S515 and the image side surface S516 are spherical surfaces; the object side surface S516 of the ninth lens L59 is a concave surface and the image side surface S517 of the ninth lens L59 is a convex surface; the tenth lens L510 is a biconvex lens with positive refractive power and made of glass material, wherein the object side surface S518 is a convex surface, the image side surface S519 is a convex surface, and the object side surface S518 and the image side surface S519 are spherical surfaces; the ninth lens L59 and the seventh Lens L57 are cemented; both of the object side surface S520 and image side surface S521 of the optical filter OF5 are plane surfaces; and both of the object side surface S522 and image side surface S523 of the cover glass CG5 are plane surfaces.

With the above design of the lenses and stop ST5 and at least any one of the conditions (5)-(12) satisfied, the wide-angle lens assembly 5 can have an effective shortened total lens length, an effective increased field of view, an effective increased brightness, an effective increased resolution, an effective resisted environmental temperature change, an effective increased resolution, an effective corrected aberration, and is capable of an effective corrected chromatic aberration.

Table 11 shows the optical specification of the wide-angle lens assembly 5 in FIG. 9.

TABLE 11

Effective Focal Length = 1.210 mm F-number = 1.6
Total Lens Length = 25.291 mm Field of View = 182.800 degrees

| Surface Number | Radius of Curvature (mm) | Thickness (mm) | Nd | Vd | Effective Focal Length (mm) | Remark |
|---|---|---|---|---|---|---|
| S51 | 11.442 | 0.900 | 1.946 | 18.0 | −11.5770 | The First Lens L51 |
| S52 | 5.063 | 2.653 | | | | |
| S53 | 15.286 | 0.600 | 1.743 | 49.3 | −6.3095 | The Second Lens L52 |
| S54 | 4.021 | 3.000 | | | | |
| S55 | −5.000 | 0.600 | 1.834 | 37.2 | −5.5656 | The Third Lens L53 |
| S56 | 6.000 | 1.986 | | | | |
| S57 | 12.000 | 1.759 | 1.805 | 25.4 | 7.1917 | The Fourth Lens L54 |
| S58 | −13.000 | 2.478 | | | | |
| S59 | 17.448 | 2.190 | 1.847 | 23.8 | 9.8235 | The Fifth Lens L55 |
| S510 | −11.573 | 0.367 | | | | |
| S511 | ∞ | −0.269 | | | | Stop ST5 |
| S512 | 3.803 | 1.518 | 1.497 | 81.5 | 4.0887 | The Sixth Lens L56 |
| S513 | −3.803 | 0.500 | 1.847 | 23.8 | −2.3417 | The Eighth Lens L58 |
| S514 | 4.463 | 0.320 | | | | |
| S515 | 54.712 | 1.318 | 1.497 | 81.5 | 5.7034 | The Seventh Lens L57 |
| S516 | −2.973 | 0.500 | 1.835 | 42.7 | −22.6959 | The Ninth Lens L59 |
| S517 | −3.793 | 0.100 | | | | |
| S518 | 8.360 | 1.273 | 1.595 | 67.7 | 6.4330 | The Tenth Lens L510 |
| S519 | −14.142 | 0.487 | | | | |
| S520 | ∞ | 0.210 | 1.517 | 64.2 | | Optical Filter OF5 |
| S521 | ∞ | 2.202 | | | | |
| S522 | ∞ | 0.400 | 1.517 | 64.2 | | Cover Glass CG5 |
| S523 | ∞ | 0.200 | | | | |

Table 12 shows the parameters and condition values for conditions (5)-(12) in accordance with the fifth embodiment of the invention. It can be seen from Table 12 that the wide-angle lens assembly 5 of the fifth embodiment satisfies the conditions (5)-(12).

TABLE 12

| IH | 1.875 mm | A | 3.152 mm | IH | 1.875 mm |
|---|---|---|---|---|---|
| f/IH | 0.645 | $R_{21} - R_{22}$ | 11.265 mm | $R_{31}/R_{32}$ | −0.833 |
| $(f_3 + f_{RL1})/f$ | 0.717 | $Vd_5/Nd_5$ | 12.886 | $\|f_1/f\|$ | 9.568 |
| $R_{RL21} + R_{RL22}$ | −6.766 mm | A/IH | 1.68 | | |

Figure 10A:
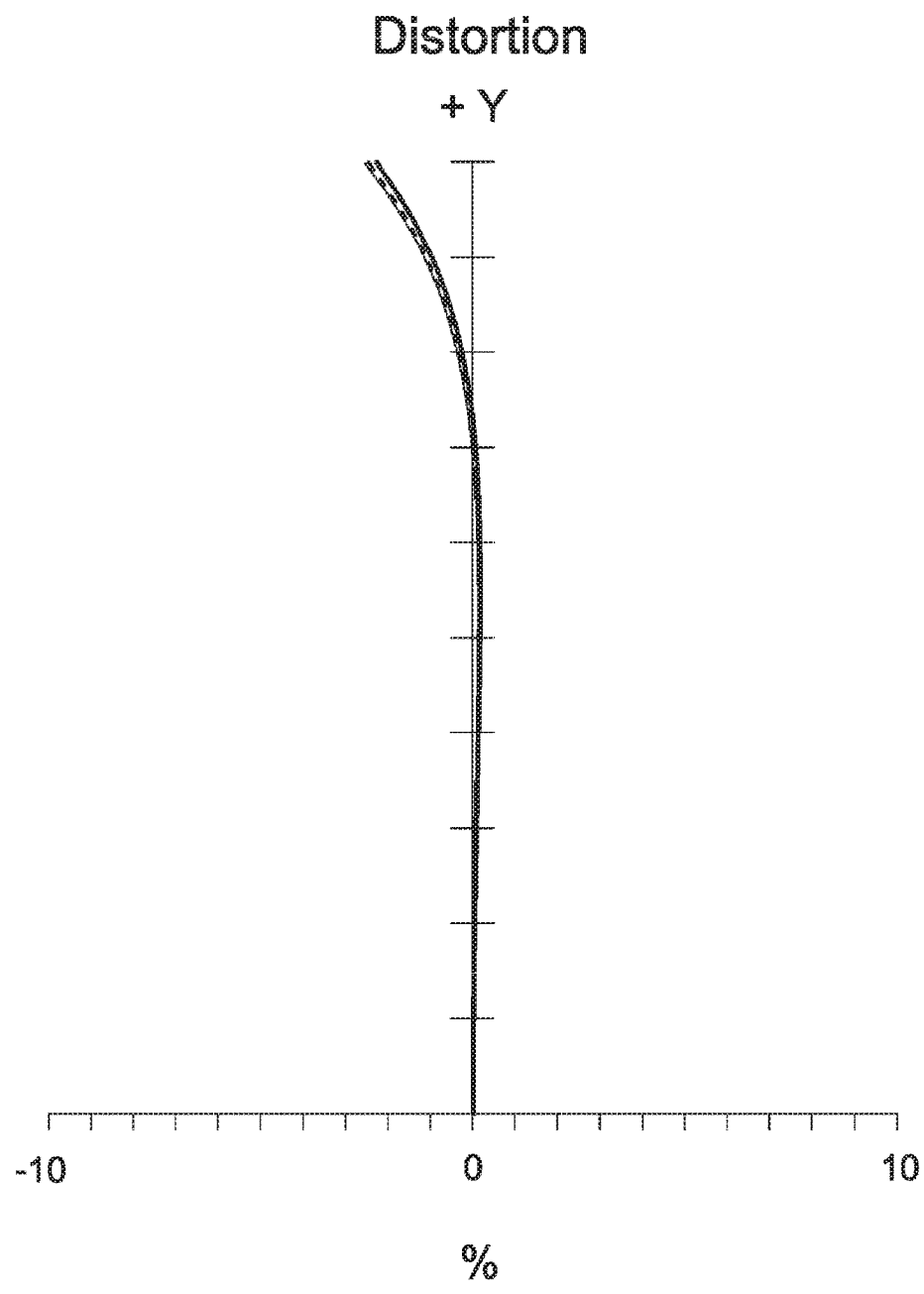
FIG. 10A depicts a distortion diagram of the wide-angle lens assembly in accordance with the fifth embodiment of the invention.
Figure 10B:
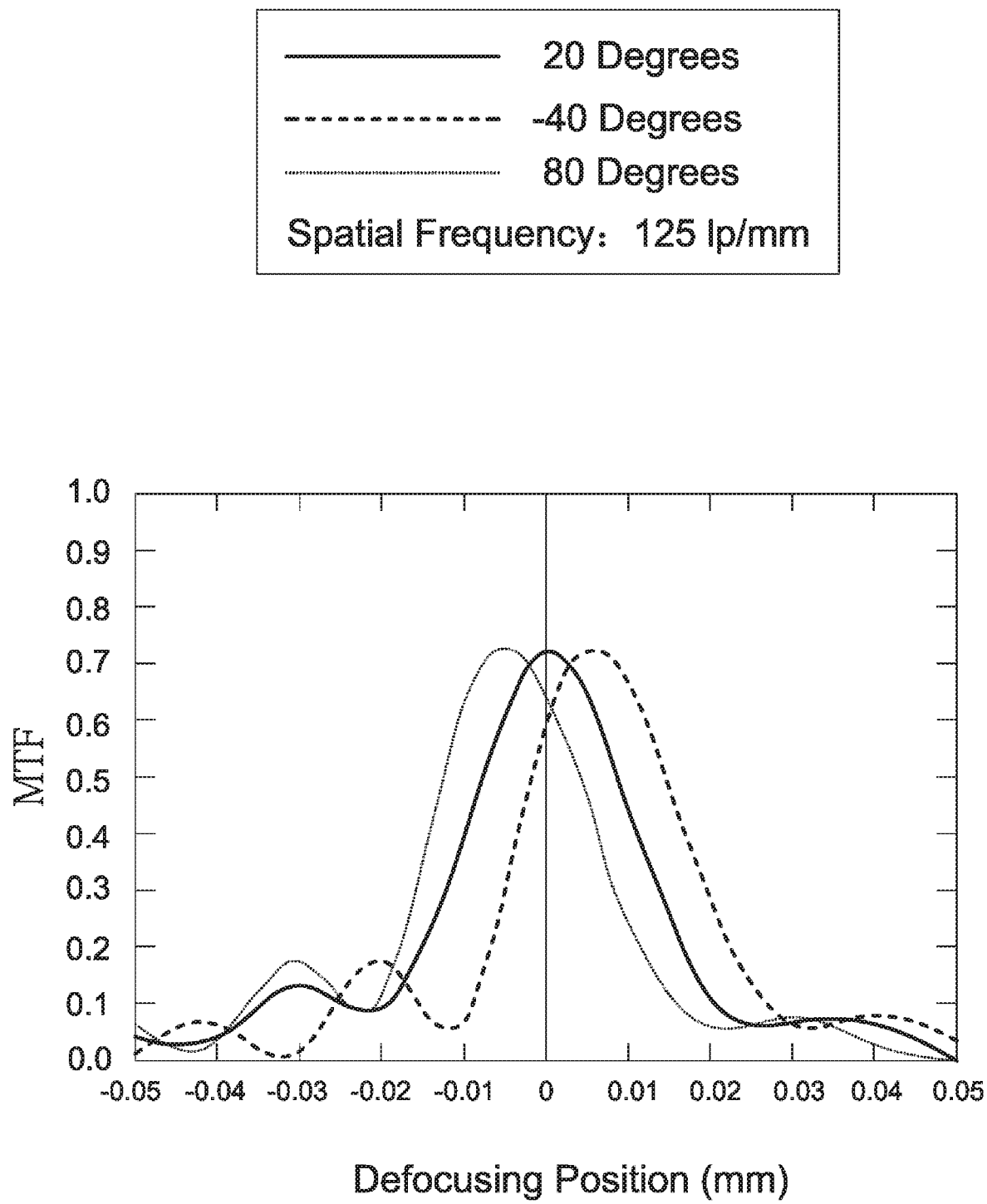
FIG. 10B is a through focus modulation transfer function diagram of the wide-angle lens assembly in accordance with the fifth embodiment of the invention when temperature is equal to $-40°$ C., $20°$ C., $80°$ C. respectively.
Figure 10C:
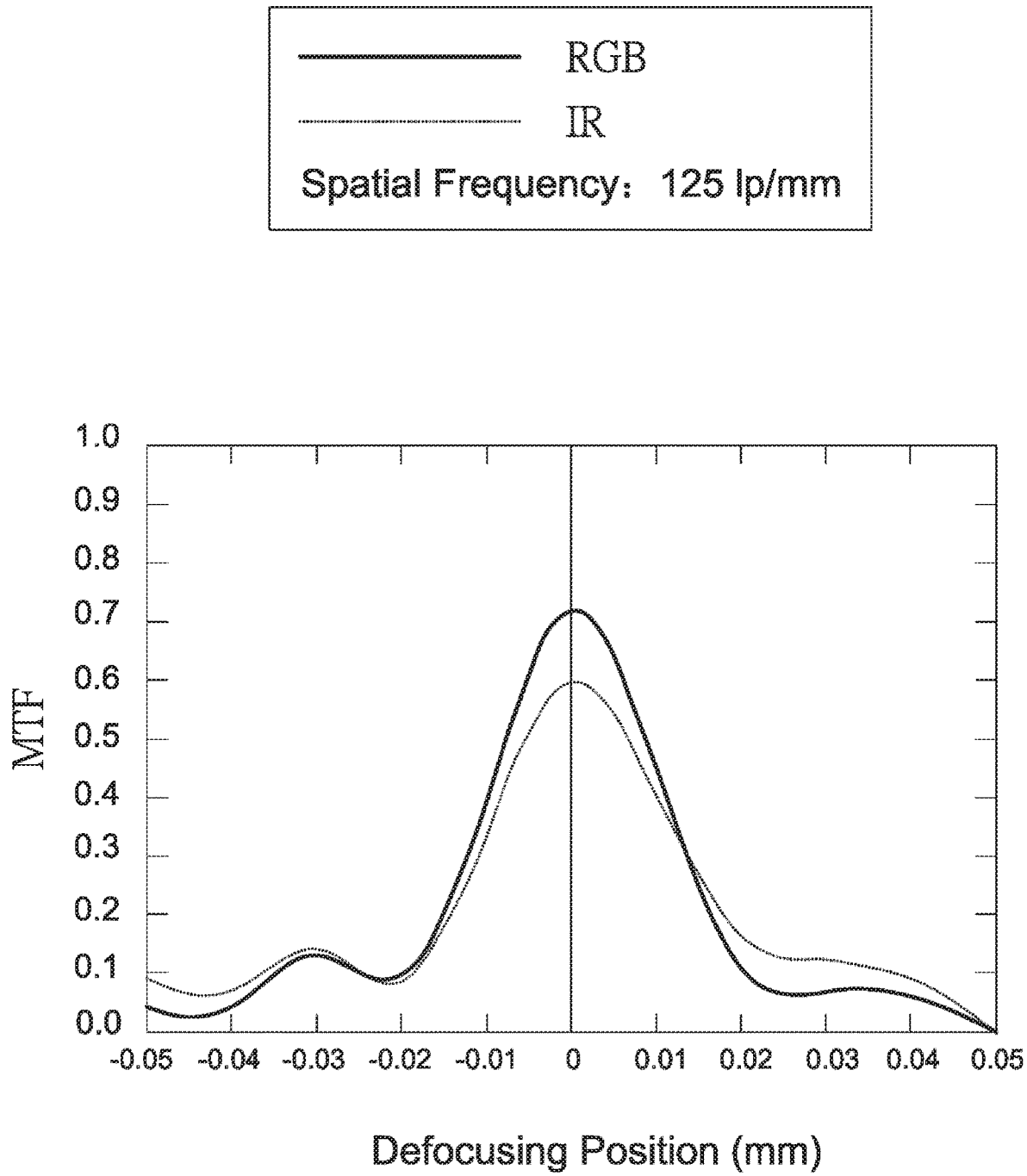
FIG. 10C is a through focus modulation transfer function diagram of the wide-angle lens assembly in accordance with the fifth embodiment of the invention when wavelength band is red-green-blue light, infrared light respectively.

By the above arrangements of the lenses and stop ST5, the wide-angle lens assembly 5 of the fifth embodiment can meet the requirements of optical performance as seen in FIGS. 10A-10C.

It can be seen from FIG. 10A that the distortion in the wide-angle lens assembly 5 of the fifth embodiment ranges from −3% to 0%. It can be seen from FIG. 10B that the through focus modulation transfer function in the lens assembly 5 of the fifth embodiment ranges from 0 to 0.72 as focus shift ranges from −0.05 mm to 0.05 mm when temperature is equal to −20° C., 40° C., 80° C. respectively. It can be seen from FIG. 10C that the modulation transfer function in the lens assembly 5 of the fifth embodiment ranges from 0.0 to 0.72 as focus shift ranges from −0.05 mm to 0.05 mm when wavelength band is red-green-blue light, infrared light respectively.

It is obvious that the distortion of the wide-angle lens assembly 5 of the fifth embodiment can be corrected effectively, and the depth of focus of high temperature, low temperature, visible light, and infrared light for the lens assembly 5 of the fifth embodiment can meet the requirement. Therefore, the wide-angle lens assembly 5 of the fifth embodiment is capable of good optical performance.

Figure 11:
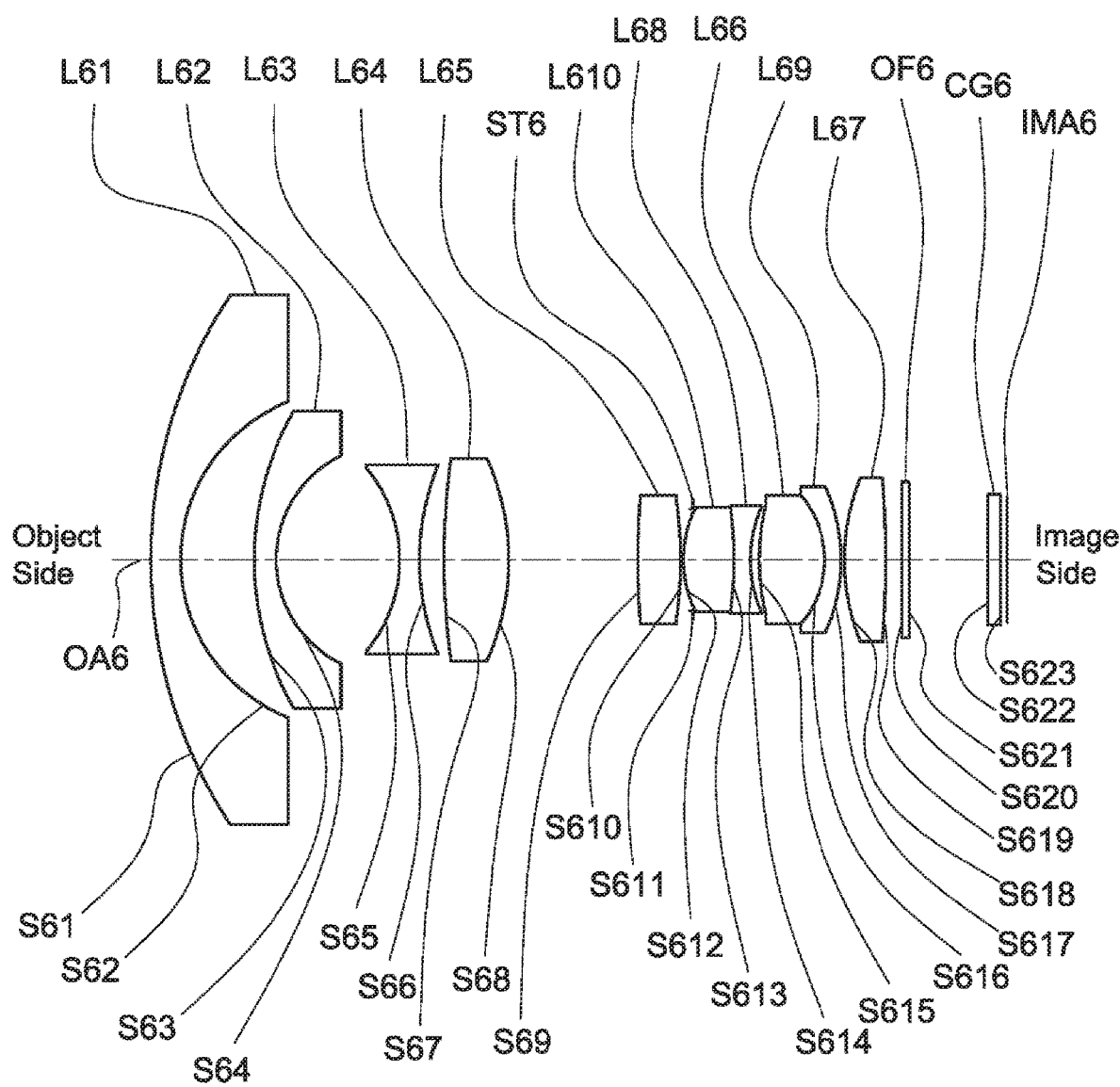
FIG. 11 is a lens layout diagram of a wide-angle lens assembly in accordance with a sixth embodiment of the invention.

Referring to FIG. 11, the wide-angle lens assembly 6 includes a first lens L61, a second lens L62, a third lens L63, a fourth lens L64, a fifth lens L65, a stop ST6, a tenth lens L610, an eighth lens L68, a sixth lens L66, a ninth lens L69, a seventh lens L67, an optical filter OF6, and a cover glass CG6, all of which are arranged in order from an object side to an image side along an optical axis OA6. In operation, an image of light rays from the object side is formed at an image plane IMA6.

According to the foregoing, wherein: the first lens L61 is a meniscus lens, wherein the object side surface S61 is a convex surface; the object side surface S63 of the second lens L62 is a convex surface and the image side surface S64 of the second lens L62 is a concave surface; the third lens L63 is a biconcave lens with negative refractive power and made of glass material, wherein the object side surface S65 is a concave surface and the image side surface S66 is a concave surface; the fourth lens L64 is a biconvex lens, wherein the image side surface S68 is a convex surface; the tenth lens L610 is a biconvex lens with positive refractive power and made of glass material, wherein the object side surface S612 is a convex surface, the image side surface S613 is a convex surface, and the object side surface S612 and the image side surface S613 are spherical surfaces; the object side surface S616 of the ninth lens L69 is a concave surface and the image side surface S617 of the ninth lens L69 is a convex surface; the seventh lens L67 is a biconvex lens, wherein the image side surface S619 is a convex surface and the object side surface S618 and the image side surface S619 are spherical surfaces; the ninth lens L69 and the sixth lens L66 are cemented; both of the object side surface S620 and image side surface S621 of the optical filter OF6 are plane surfaces; and both of the object side surface S622 and image side surface S623 of the cover glass CG6 are plane surfaces.

With the above design of the lenses and stop ST6 and at least any one of the conditions (5)-(12) satisfied, the wide-angle lens assembly 6 can have an effective shortened total lens length, an effective increased field of view, an effective increased brightness, an effective increased resolution, an effective resisted environmental temperature change, an effective increased resolution, an effective corrected aberration, and is capable of an effective corrected chromatic aberration.

Table 13 shows the optical specification of the wide-angle lens assembly 6 in FIG. 11.

TABLE 13

Effective Focal Length = 1.330 mm F-number = 1.7
Total Lens Length = 26.015 mm Field of View = 180.000 degrees

| Surface Number | Radius of Curvature (mm) | Thickness (mm) | Nd | Vd | Effective Focal Length (mm) | Remark |
|---|---|---|---|---|---|---|
| S61 | 15.119 | 0.898 | 1.883 | 40.8 | −10.0926 | The First Lens L61 |
| S62 | 5.278 | 2.235 | | | | |
| S63 | 9.309 | 0.686 | 1.883 | 40.8 | −7.1092 | The Second Lens L62 |
| S64 | 3.629 | 3.744 | | | | |
| S65 | −4.455 | 0.600 | 1.497 | 81.6 | −5.7507 | The Third Lens L63 |
| S66 | 7.953 | 0.736 | | | | |
| S67 | 23.137 | 1.962 | 1.954 | 32.3 | 6.9875 | The Fourth Lens L64 |
| S68 | −7.716 | 3.936 | | | | |
| S69 | 26.772 | 1.290 | 1.497 | 81.6 | 12.2340 | The Fifth Lens L65 |
| S610 | −13.496 | 0.372 | | | | |
| S611 | ∞ | −0.281 | | | | Stop ST6 |
| S612 | 3.815 | 1.526 | 1.497 | 81.6 | 6.0807 | The Tenth Lens L610 |
| S613 | −12.741 | 0.501 | 1.847 | 23.8 | −3.6541 | The Eighth Lens L68 |
| S614 | 4.201 | 0.265 | | | | |
| S615 | 7.409 | 1.995 | 1.497 | 81.6 | 4.6597 | The Sixth Lens L66 |
| S616 | −3.077 | 0.502 | 1.835 | 42.7 | −8.9554 | The Ninth Lens L69 |
| S617 | −5.602 | 0.102 | | | | |
| S618 | 6.927 | 1.248 | 1.835 | 42.7 | 6.9022 | The Seventh Lens L67 |
| S619 | −32.249 | 0.500 | | | | |
| S620 | ∞ | 0.210 | 1.517 | 64.2 | | Optical Filter OF6 |
| S621 | ∞ | 2.387 | | | | |
| S622 | ∞ | 0.400 | 1.517 | 64,2 | | Cover Glass CG6 |
| S623 | ∞ | 0.200 | | | | |

Table 14 shows the parameters and condition values for conditions (5)-(12) in accordance with the sixth embodiment of the invention. It can be seen from Table 14 that the wide-angle lens assembly 6 of the sixth embodiment satisfies the conditions (5)-(12).

TABLE 14

| IH | 1.875 mm | A | 3.172 mm | IH | 1.875 mm |
|---|---|---|---|---|---|
| f/IH | 0.709 | $R_{21} - R_{22}$ | 5.680 mm | $R_{31}/R_{32}$ | −0.560 |
| $(f_3 + f_{RL1})/f$ | 0.866 | $Vd_5/Nd_5$ | 54.509 | $\|f_1/f\|$ | 7.588 |
| $R_{RL21} + R_{RL22}$ | −8.679 mm | A/IH | 1.69 | | |

Figure 12A:
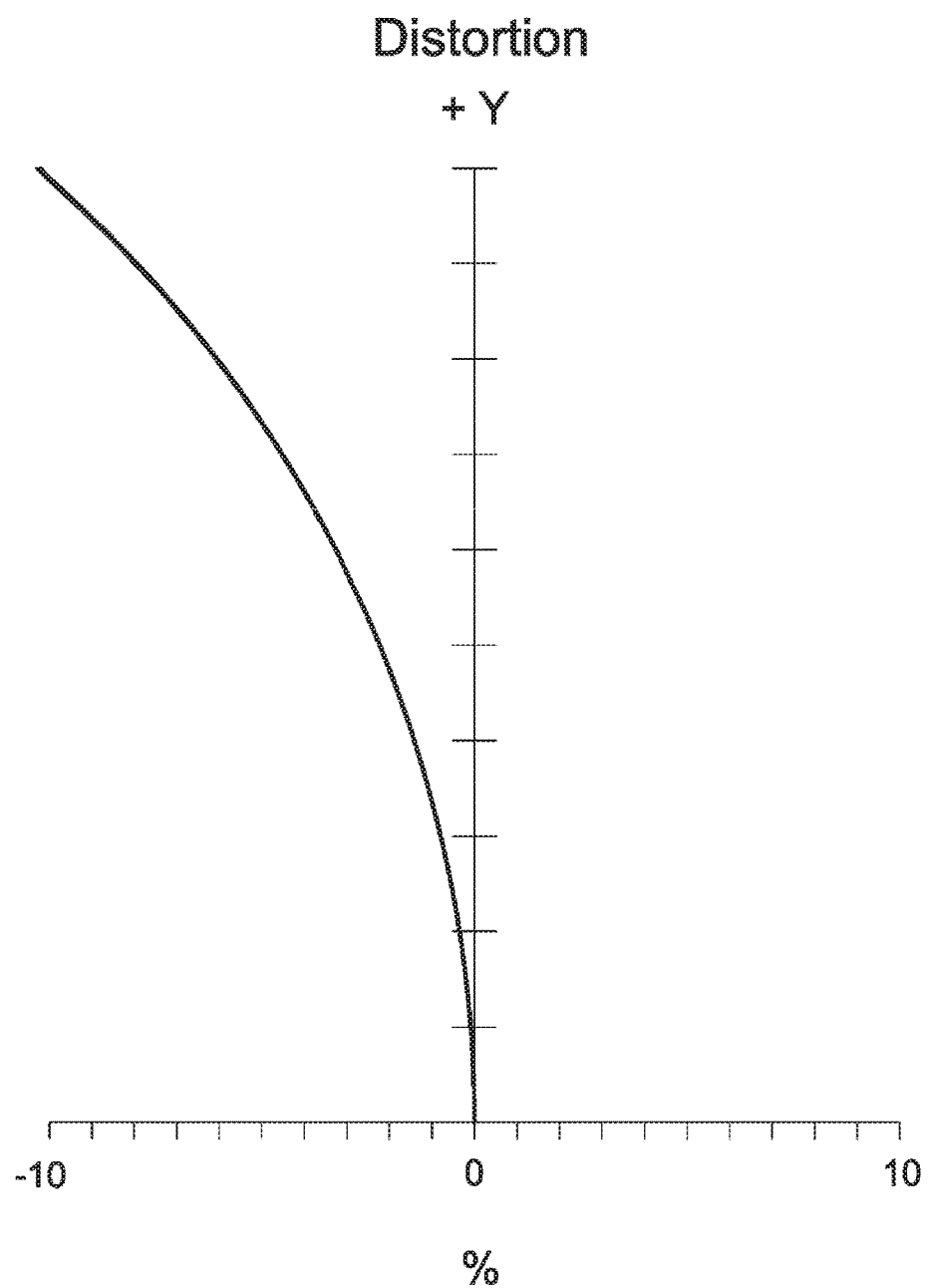
FIG. 12A depicts a distortion diagram of the wide-angle lens assembly in accordance with the sixth embodiment of the invention.
Figure 12B:
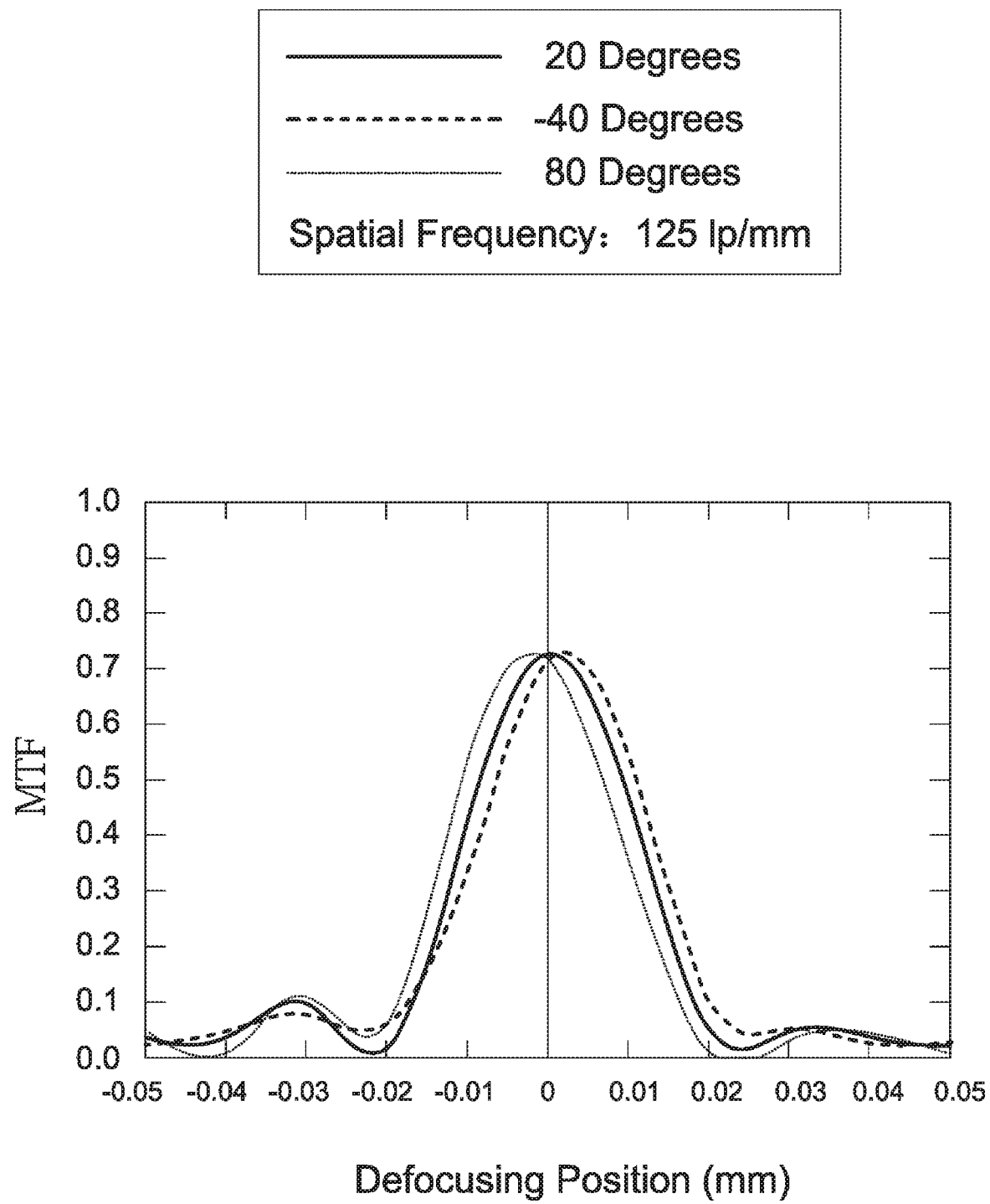
FIG. 12B is a through focus modulation transfer function diagram of the wide-angle lens assembly in accordance with the sixth embodiment of the invention when temperature is equal to −40° C., 20° C., 80° C. respectively.
Figure 12C:
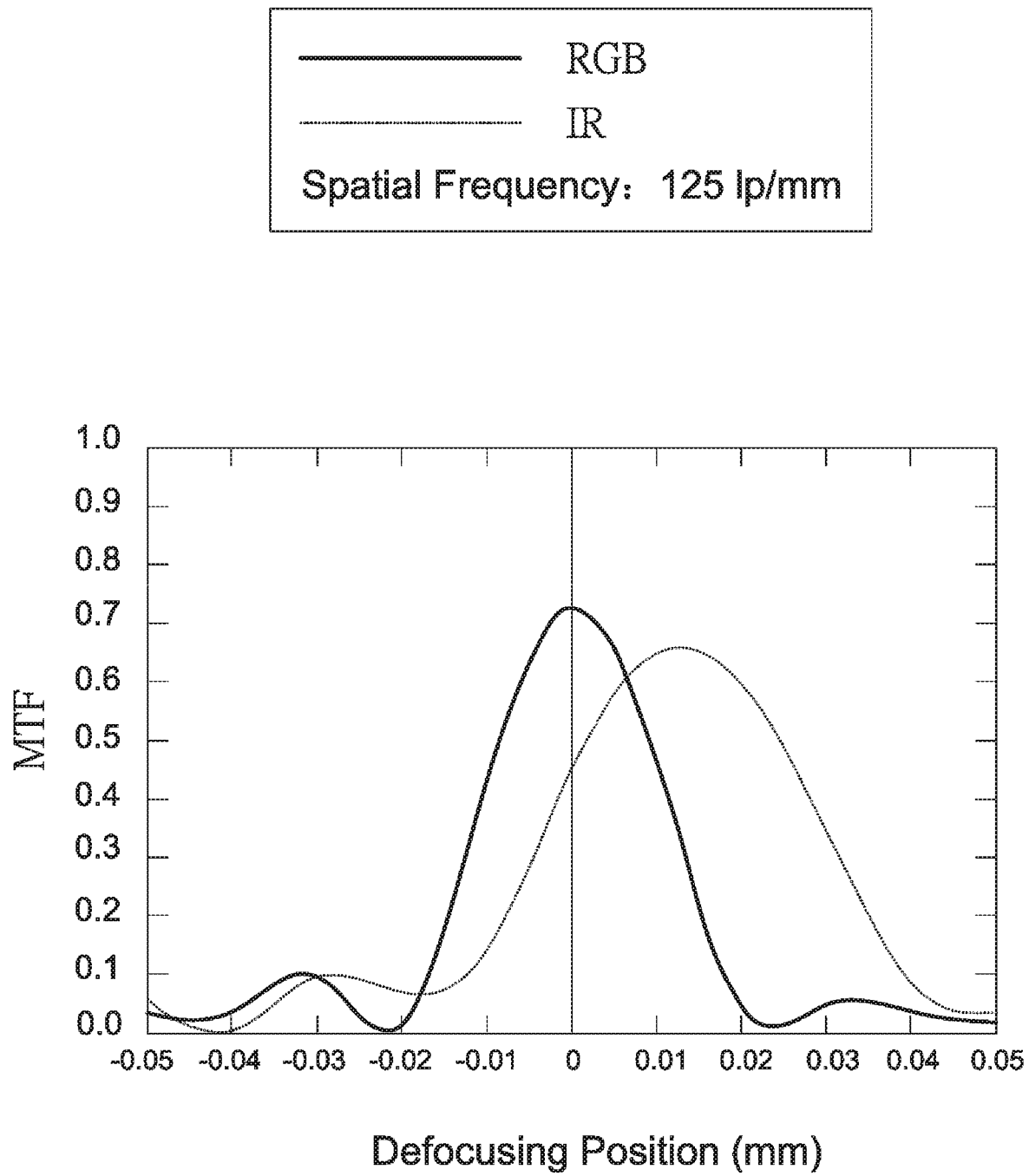
FIG. 12C is a through focus modulation transfer function diagram of the wide-angle lens assembly in accordance with the sixth embodiment of the invention when wavelength band is red-green-blue light, infrared light respectively.

By the above arrangements of the lenses and stop ST6, the wide-angle lens assembly 6 of the sixth embodiment can meet the requirements of optical performance as seen in FIGS. 12A-12C.

It can be seen from FIG. 12A that the distortion in the wide-angle lens assembly 6 of the sixth embodiment ranges from −10% to 0%. It can be seen from FIG. 12B that the through focus modulation transfer function in the lens assembly 6 of the sixth embodiment ranges from 0 to 0.73 as focus shift ranges from −0.05 mm to 0.05 mm when temperature is equal to −20° C., 40° C., 80° C. respectively. It can be seen from FIG. 12C that the modulation transfer function in the lens assembly 6 of the sixth embodiment ranges from 0.0 to 0.73 as focus shift ranges from −0.05 mm to 0.05 mm when wavelength band is red-green-blue light, infrared light respectively.

It is obvious that the distortion of the wide-angle lens assembly 6 of the sixth embodiment can be corrected effectively, and the depth of focus of high temperature, low temperature, visible light, and infrared light for the lens assembly 6 of the sixth embodiment can meet the requirement. Therefore, the wide-angle lens assembly 6 of the sixth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a first lens which is with negative refractive power and comprises a concave surface facing an image side;
   a second lens which is a meniscus lens with negative refractive power;
   a third lens which is with refractive power;
   a fourth lens which is with positive refractive power and comprises a convex surface facing an object side;
   a fifth lens which is a biconvex lens with positive refractive power and comprises a convex surface facing the object side and another convex surface facing the image side;
   a sixth lens which is a biconvex lens with positive refractive power and comprises a convex surface facing the object side and another convex surface facing the image side;
   a seventh lens which is with positive refractive power and comprises a convex surface facing the object side;
   an eighth lens which is a biconcave lens with negative refractive power and comprises a concave surface facing the object side and another concave surface facing the image side;
   a ninth lens which is with negative refractive power; and
   a stop;
   wherein the first lens, the second lens, the third lens, the fourth lens, the fifth lens, the sixth lens, and the seventh lens are arranged in order from the object side to the image side along an optical axis;
   wherein the eighth lens is disposed between the fifth lens and the seventh lens and is cemented with at least one lens;
   wherein the ninth lens is disposed between the fifth lens and the image side;
   wherein the stop is disposed between the fourth lens and the sixth lens;
   wherein the wide-angle lens assembly satisfies the following condition:
   1.3<A/IH <2.1; wherein A is a diameter of the stop and IH is a maximum image height of the wide-angle lens assembly;
   wherein the wide-angle lens assembly satisfies the following_condition:
   wherein $R_{RL21}$ is a radius of curvature of an object side surface of a lens second close to the image side, and $R_{RL22}$ is a radius of curvature of an image side surface of a lens second close to the image side.

2. The wide-angle lens assembly as claimed in claim 1, wherein the ninth lens is a meniscus lens.

3. The wide-angle lens assembly as claimed in claim 2, further comprising a tenth lens disposed between the fifth lens and the image side, wherein the tenth lens is with positive refractive power and comprises a convex surface facing the object side.

4. The wide-angle lens assembly as claimed in claim 3, wherein the tenth lens further comprises a convex surface facing the image side.

5. The wide-angle lens assembly as claimed in claim 3, wherein the tenth lens further comprises a concave surface facing the image side.

6. The wide-angle lens assembly as claimed in claim 5, wherein the wide-angle lens assembly satisfies the following conditions:

$$0.2 < f/TTL < 0.35;$$

$$7.5 < T_{RL1}/T_1 < 14;$$

$$1 < f_{1234}/f < 2.1;$$

$$0 < f/IH < 1;$$

$$10 < Vd_5/Nd_5 < 58;$$

$$0.5 < (f_3 + f_{RL1})/f < 3;$$

$$7.2 < |f_1/f| < 11;$$

$$4.5 \text{ mm} < R_{21} - R_{22} < 13.5 \text{ mm};$$

$$-10 < R_{31}/R_{32} < 0;$$

wherein f is an effective focal length of the wide-angle lens assembly, $f_1$ is an effective focal length of the first lens, $f_3$ is an effective focal length of the third lens, $f_{RL1}$ is an effective focal length of a lens closest to the image side, $f_{1234}$ is an effective focal length of a combination of the first lens, the second lens, the third lens, and the fourth lens, TTL is an interval from an object side surface of the first lens to an image plane along the optical axis, $T_1$ is a thickness along the optical axis of the first lens, $T_{RL1}$ is a thickness along the optical axis of a lens closest to the image side, IH is a maximum image height of the wide-angle lens assembly, $Vd_5$ is an Abbe number of the fifth lens, $Nd_5$ is an index of refraction of the fifth lens, $R_{21}$ is a radius of curvature of an object side surface of the second lens, $R_{22}$ is a radius of curvature of an image side surface of the second lens, $R_{31}$ is a radius of curvature of an object side surface of the third lens, and $R_{32}$ is a radius of curvature of an image side surface of the third lens.

7. The wide-angle lens assembly as claimed in claim 2, wherein the third lens is a biconvex lens with positive refractive power and comprises a convex surface facing the object side and another convex surface facing the image side.

8. The wide-angle lens assembly as claimed in claim 7, wherein:
the first lens further comprises a concave surface facing the object side; and
the second lens comprises a concave surface facing the object side and a convex surface facing the image side.

9. The wide-angle lens assembly as claimed in claim 8, wherein:
the fourth lens further comprises another convex surface facing the image side;
the seventh lens further comprises a concave surface facing the image side; and
the ninth lens is a meniscus lens and comprises a concave surface facing the object side and a convex surface facing the image side;
wherein the ninth lens is cemented with at least one lens.

10. The wide-angle lens assembly as claimed in claim 7, wherein:
the fourth lens further comprises a concave surface facing the image side; and
the ninth lens is a meniscus lens and comprises a convex surface facing the object side and a concave surface facing the image side.

11. The wide-angle lens assembly as claimed in claim 2, wherein the third lens is a biconcave lens with negative refractive power and comprises a concave surface facing the object side and another concave surface facing the image side.

12. The wide-angle lens assembly as claimed in claim 11, wherein:
the first lens further comprises a convex surface facing the object side; and
the second lens comprises a convex surface facing the object side and a concave surface facing the image side.

13. The wide-angle lens assembly as claimed in claim 11, wherein:
the fourth lens further comprises another convex surface facing the image side; and
the ninth lens is a meniscus lens and comprises a concave surface facing the object side and a convex surface facing the image side.

14. The wide-angle lens assembly as claimed in claim 2, wherein the seventh lens further comprises a concave surface facing the image side.

15. The wide-angle lens assembly as claimed in claim 2, wherein the seventh lens further comprises a convex surface facing the image side.

16. The wide-angle lens assembly as claimed in claim 1, wherein the ninth lens is cemented with at least one lens.

17. The wide-angle lens assembly as claimed in claim 1, wherein the wide-angle lens assembly satisfies the following conditions:

$$0.2 < f/TTL < 0.35;$$

$$7.5 < T_{RL1}/T_1 < 14;$$

$$1 < f_{1234}/f < 2.1;$$

wherein f is an effective focal length of the wide-angle lens assembly, TTL is an interval from an object side surface of the first lens to an image plane along the optical axis, $T_{RL1}$ is a thickness along the optical axis of a lens closest to the image side, $T_1$ is a thickness along the optical axis of the first lens, and $f_{1234}$ is an effective focal length of a combination of the first lens, the second lens, the third lens, and the fourth lens.

18. The wide-angle lens assembly as claimed in claim 1, wherein the wide-angle lens assembly satisfies the following conditions:

$$0 < f/IH < 1;$$

$$10 < Vd_5/Nd_5 < 58;$$

wherein f is an effective focal length of the wide-angle lens assembly, IH is a maximum image height of the wide-angle lens assembly, $Vd_5$ is an Abbe number of the fifth lens, and $Nd_5$ is an index of refraction of the fifth lens.

19. The wide-angle lens assembly as claimed in claim 1, wherein the wide-angle lens assembly satisfies at least one of the following conditions:

$$4.5 \text{ mm} < R_{21} - R_{22} < 13.5 \text{ mm}$$

$$-10 < R_{31}/R_{32} < 0;$$

wherein $R_{21}$ is a radius of curvature of an object side surface of the second lens, $R_{22}$ is a radius of curvature of an image side surface of the second lens, $R_{31}$ is a radius of curvature of an object side surface of the third lens, $R_{32}$ is a radius of curvature of an image side surface of the third lens.

20. The wide-angle lens assembly as claimed in claim 1, wherein the wide-angle lens assembly satisfies the following conditions $$0.5 < (f_3 + f_{RL1})/f < 3;$$

$$7.2 < |f_1/f| < 11;$$

wherein f1 is an effective focal length of the first lens, f3 is an effective focal length of the third lens, $f_{RL1}$ is an effective focal length of a lens closest to the image side, and f is an effective focal length of the wide-angle lens assembly.

\* \* \* \* \*